US011639403B2

(12) United States Patent
Choi et al.

(10) Patent No.: US 11,639,403 B2
(45) Date of Patent: May 2, 2023

(54) POLYMER, COMPOSITE POSITIVE ACTIVE MATERIAL INCLUDING THE SAME, AND LITHIUM SECONDARY BATTERY INCLUDING ELECTRODE INCLUDING THE POSITIVE ACTIVE MATERIAL

(71) Applicants: Samsung Electronics Co., Ltd., Suwon-si (KR); Waseda University, Tokyo (JP)

(72) Inventors: Wonsung Choi, Seoul (KR); Hiroyuki Nishide, Tokyo (JP); Seokgwang Doo, Seoul (KR); Kenichi Oyaizu, Tokyo (JP)

(73) Assignees: SAMSUNG ELECTRONICS CO., LTD., Gyeonggi-Do (KR); WASEDA UNIVERSITY, Tokyo (JP)

( * ) Notice: Subject to any disclaimer, the term of this patent is extended or adjusted under 35 U.S.C. 154(b) by 733 days.

(21) Appl. No.: 16/679,540

(22) Filed: Nov. 11, 2019

(65) Prior Publication Data

US 2020/0148797 A1     May 14, 2020

(30) Foreign Application Priority Data

Nov. 9, 2018   (KR) .................. 10-2018-0137601

(51) Int. Cl.
*C08F 26/06*   (2006.01)
*H01M 10/0525*   (2010.01)
(Continued)

(52) U.S. Cl.
CPC .............. *C08F 26/06* (2013.01); *C08F 28/06* (2013.01); *H01M 4/608* (2013.01);
(Continued)

(58) Field of Classification Search
CPC ......... C08F 26/06; C08F 28/06; H01M 4/608; H01M 10/0525; H01M 2010/4292;
(Continued)

(56) References Cited

U.S. PATENT DOCUMENTS

| 4,463,071 A | 7/1984 | Gifford et al. |
| 4,505,841 A | 3/1985 | Denisevich, Jr. |

(Continued)

FOREIGN PATENT DOCUMENTS

| CN | 101630729 B | 3/2011 |
| CN | 103746094 A | 4/2014 |

(Continued)

OTHER PUBLICATIONS

Speer et al., "Thianthrene-functionalized polynorbornenes as high-voltage materials for organic cathode-based dual-ion batteries", ChemComm, The Royal Society of Chemistry, 2013, 1-3.
(Continued)

*Primary Examiner* — Doris L Lee
(74) *Attorney, Agent, or Firm* — Cantor Colburn LLP

(57) ABSTRACT

A polymer includes a repeating unit represented by at least one of Formula 1a or Formula 1b:

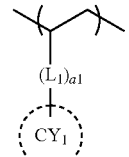

Formula 1a

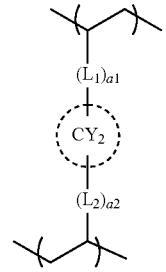

Formula 1b wherein, in Formulae 1a or 1b, $CY_1$ is a group represented by at least one of Formula 1-2 or Formula 1-4, $CY_2$ is a group represented by Formula 1-3, and $L_1$, $L_2$, a1, and a2 are defined the same as in the specification, and <Formula 1-2>

<Formula 1-3>

<Formula 1-4>

(Continued)

in Formulae 1-2, Formula 1-3, or 1-4, X, Y, $R_1$, $R_2$, $R_{11}$ to $R_{14}$, b1, b2, $R_{21}$, $R_{22}$, b21, b22, $Z_1$, $Z_2$, c1, and c2 are defined the same as in the specification.

20 Claims, 7 Drawing Sheets

(51) Int. Cl.
| | | |
|---|---|---|
| | *H01M 4/60* | (2006.01) |
| | *C08F 28/06* | (2006.01) |
| | *H01M 10/42* | (2006.01) |
| | *C08L 41/00* | (2006.01) |
| | *C08L 39/04* | (2006.01) |
| | *C08K 3/22* | (2006.01) |

(52) U.S. Cl.
CPC . *H01M 10/0525* (2013.01); *C08K 2003/2217* (2013.01); *C08K 2003/2227* (2013.01); *C08K 2003/2237* (2013.01); *C08K 2003/2248* (2013.01); *C08K 2003/2251* (2013.01); *C08K 2003/2255* (2013.01); *C08K 2003/2258* (2013.01); *C08K 2003/2262* (2013.01); *C08K 2003/2289* (2013.01); *C08K 2003/2293* (2013.01); *C08K 2003/2296* (2013.01); *C08L 39/04* (2013.01); *C08L 41/00* (2013.01); *H01M 2010/4292* (2013.01)

(58) Field of Classification Search
CPC .... C08K 2003/2217; C08K 2003/2227; C08K 2003/2237; C08K 2003/2248; C08K 2003/2251; C08K 2003/2255; C08K 2003/2258; C08K 2003/2262; C08K 2003/2289; C08K 2003/2293; C08K 2003/2296; C08L 39/04; C08L 41/00
See application file for complete search history.

(56) References Cited

U.S. PATENT DOCUMENTS

| | | | |
|---|---|---|---|
| 5,858,573 A | * | 1/1999 | Abraham .......... H01M 10/0567 |
| | | | 429/340 |
| 6,641,759 B1 | | 11/2003 | Harada et al. |
| 8,993,708 B2 | | 3/2015 | Shibano et al. |
| 10,340,551 B2 | | 7/2019 | Yao et al. |
| 2017/0062842 A1 | | 3/2017 | Huang et al. |
| 2019/0207210 A1 | | 7/2019 | Kubo et al. |
| 2019/0229335 A1 | * | 7/2019 | Wild ..................... H01M 4/623 |

FOREIGN PATENT DOCUMENTS

| | | | |
|---|---|---|---|
| CN | 103904356 A | | 7/2014 |
| EP | 0320954 A2 | | 6/1989 |
| JP | 3287837 B2 | | 3/2002 |
| JP | 4590682 B2 | | 9/2010 |
| KR | 20010040111 A | | 5/2001 |
| KR | 101127693 B1 | | 3/2012 |
| KR | 1020140125799 A | | 10/2014 |
| KR | 1020170027657 A | | 3/2017 |
| KR | 1020170042660 A | | 4/2017 |
| WO | 2018024901 A1 | | 2/2018 |
| WO | WO 2018/024901 | * | 2/2018 |

OTHER PUBLICATIONS

Wild et al., "All-Organic Battery Composed of Thianthrene- and TCAQ-Based Polymers", Adv. Energy Mater. 2016, 1601415, 1-9.
Yao et al., "Redox active poly(N-vinylcarbazole) for use in rechargeable lithium batteries", Journal of Power Sources, 202, 2012, pp. 364-368.

* cited by examiner

POLYMER, COMPOSITE POSITIVE ACTIVE MATERIAL INCLUDING THE SAME, AND LITHIUM SECONDARY BATTERY INCLUDING ELECTRODE INCLUDING THE POSITIVE ACTIVE MATERIAL

CROSS-REFERENCE TO RELATED APPLICATION

This application claims the benefit and all the benefits accruing therefrom under 35 U.S.C. § 119 of Korean Patent Application No. 10-2018-0137601, filed on Nov. 9, 2018, in the Korean Intellectual Property Office, the content of which is incorporated herein in its entirety by reference.

BACKGROUND

1. Field

The present disclosure relates to a polymer, a composite positive active material including the polymer, and a lithium secondary battery that includes an electrode including the composite positive active material.

2. Description of the Related Art

As the demand for small portable electronic products such as laptop computers, mobile phones, and the like, and large-sized electronic products such as electric carts, electric wheelchairs, electric bicycles, and the like, continues to grow, research and development of high-performance batteries capable of being repeatedly charged and discharged is of great commercial interest.

In particular, with the recent increasing demand for environmentally friendly vehicles, such as electric vehicles, there has been a great deal of interest and research on high-capacity batteries having a high operating potential. Moreover, there is interest on developing rapid charging technology for such high-capacity batteries.

However, there remains a need for improved materials compatible with a lithium secondary battery with a high potential.

SUMMARY

Provided are a polymer, a composite positive active material including the polymer, and a lithium secondary battery that includes an electrode including the composite positive active material.

According to an aspect of an embodiment, a polymer includes: a repeating unit represented by at least one of Formula 1a or Formula 1b

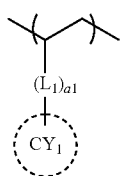

Formula 1a

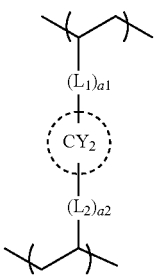

Formula 1b wherein, in Formulae 1a and 1b,
$CY_1$ is a group represented by at least one of Formula 1-2 or Formula 1-4,
$CY_2$ is a group represented by Formula 1-3,

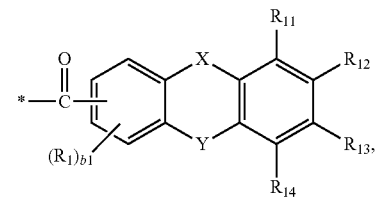

Formula 1-2

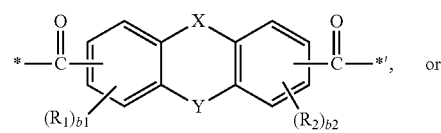

Formula 1-3

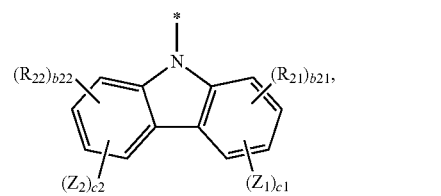

Formula 1-4

$L_1$ and $L_2$ are each independently a single bond, a substituted or unsubstituted $C_1$-$C_{20}$ alkylene group, a substituted or unsubstituted $C_2$-$C_{20}$ alkenylene group, or a substituted or unsubstituted $C_2$-$C_{20}$ alkynylene group, and
a1 and a2 are each independently an integer from 1 to 5, and two or more $L_1$ are the same or different from one another when a1 is 2 or greater, and two or more $L_2$ are the same or different from each other when a2 is 2 or greater,
wherein, in Formulae 1-2 and 1-3,
X and Y are each independently O or S,
$R_1$, $R_2$, and Ru to Rio are each independently hydrogen, deuterium, —F, —Cl, —Br, —I, a hydroxyl group, a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group, b1 and b2 are each independently an integer from 1 to 3, and two or more $R_1$ are the same or different from one another when b1 is 2 or greater, and two or more $R_2$ are the same or different from one another when b2 is 2 or greater, and in Formula 1-4, $R_{21}$ and $R_{22}$ are each independently hydrogen, deuterium, —F, —Cl, —Br, —I, a hydroxyl group, a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group, b21 and b22 are each independently an integer from 0 to 3, and two or more $R_{21}$ are the same or different from one another when b21 is 2 or greater, and two or more $R_{22}$ are the same or different from one another when b22 is 2 or greater, $Z_1$ and $Z_2$ are each independently an electron withdrawing group, c1 and c2 are each independently an integer from 1 to 4, the sum of b21 and c1 is 4, the sum of b22 and c2 is 4, * is a binding site to $L_1$ in Formulae 1a and 1b, and *' is a binding site to $L_2$ in Formula 1b.

According to an aspect, a composite positive active material includes: a metal oxide; and the polymer that includes a repeating unit represented by at least one of Formula 1a or Formula 1b.

According to an aspect, disclosed is a lithium secondary battery including: a positive electrode including the composite positive active material; a negative electrode; and an electrolyte between the positive electrode and the negative electrode.

Also disclosed is a method of manufacturing a composite positive active material, the method including: providing a mixture comprising the polymer of claim 1 and a conducting agent; and disposing the mixture on a metal current collector to manufacture the composite positive active material.

Also disclosed is a method of manufacturing a lithium secondary battery, the method including: providing a positive electrode including the composite positive active material; providing a negative electrode; and disposing an electrolyte between the positive and the negative electrode to manufacture the lithium secondary battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
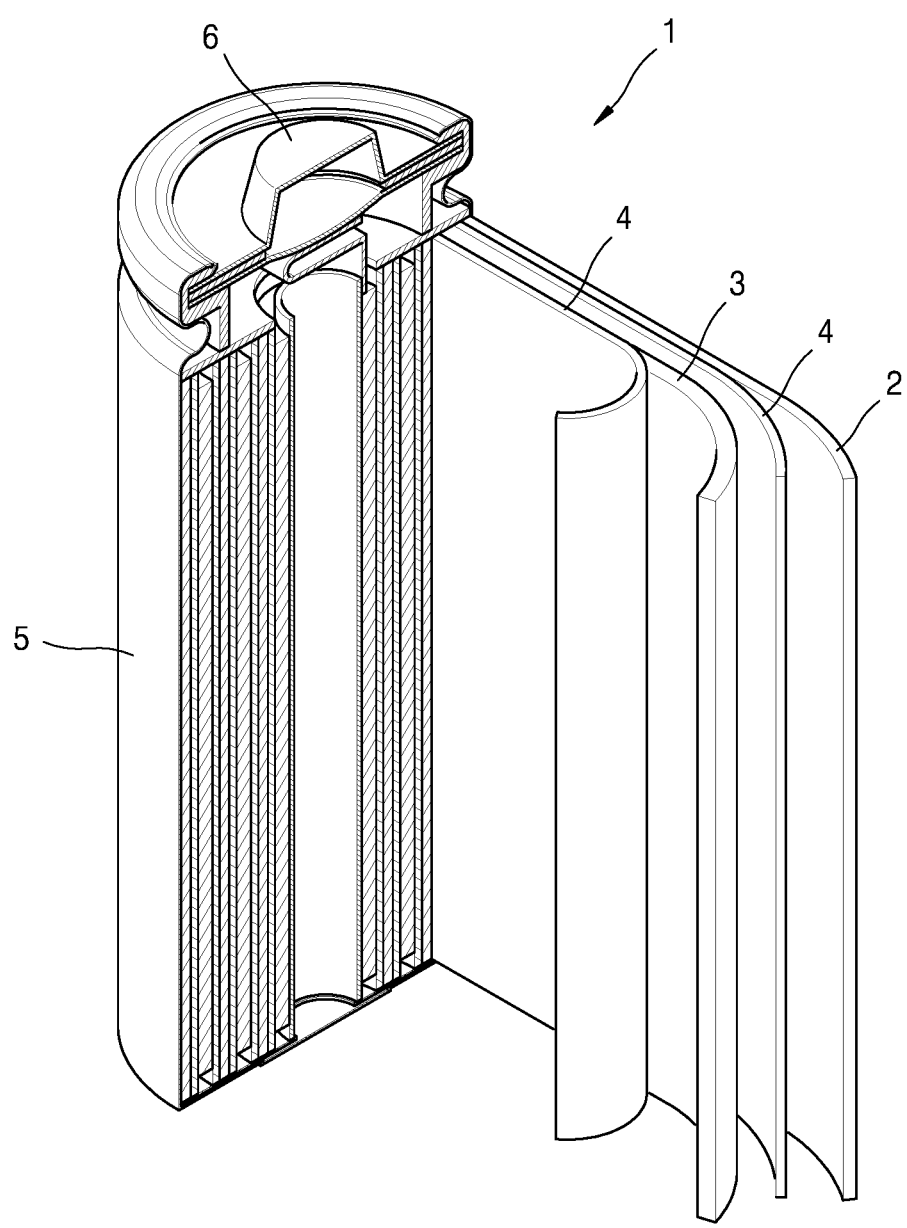
FIG. 1 is a schematic view of a lithium secondary battery according to an embodiment.

The present inventive concept will now be described more fully with reference to the accompanying drawings, in which example embodiments are shown. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A C rate means a current which will discharge a battery in one hour, e.g., a C rate for a battery having a discharge capacity of 1.6 ampere-hours would be 1.6 amperes.

According to an aspect, disclosed is a polymer that includes a repeating unit represented by at least one of Formula 1a or Formula 1b:

Formula 1a

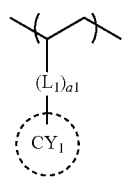

Formula 1b

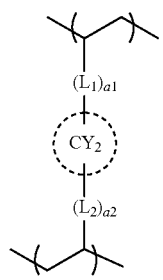

wherein, in Formulae 1a and 1b,
$CY_1$ is a group represented by at least one of Formula 1-2 or Formula 1-4,
$CY_2$ is a group represented by Formula 1-3, Formula 1-2

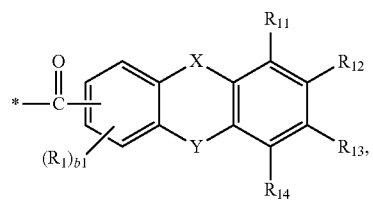

Formula 1-3

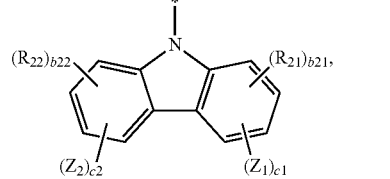

or

Formula 1-4

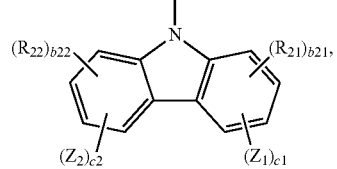

$L_1$ and $L_2$ are each independently a single bond, a substituted or unsubstituted $C_1$-$C_{20}$ alkylene group, a substituted or unsubstituted $C_2$-$C_{20}$ alkenylene group, or a substituted or unsubstituted $C_2$-$C_{20}$ alkynylene group, and a1 and a2 are each independently an integer from 1 to 5, and two or more $L_1$ are the same or different from one another when a1 is 2 or greater, and two or more $L_2$ are the same or different from each other when a2 is 2 or greater, wherein, in Formulae 1-2 and 1-3,
X and Y are each independently O or S,
$R_1$, $R_2$, and $R_{11}$ to $R_{14}$ are each independently hydrogen, deuterium (D or $^2$H), —F, —Cl, —Br, —I, a hydroxyl group (—OH), a cyano group (—CN), a nitro group (—NO$_2$), an amino group (—NH$_2$), an amidino group (—C(=NH)NH$_2$), a hydrazine group (—NHNH$_2$), a hydrazone group (=N—NH$_2$), a carboxylic acid group (—C(=O)OH) or a salt thereof (—C(=O)OM) wherein M is an organic or inorganic anion), a sulfonic acid group (—SO$_3$H$_2$) or a salt thereof (—SO$_3$MH or —SO$_3$M$_2$ wherein M is an organic or inorganic anion), a phosphoric acid (—PO$_3$H$_2$), a phosphoric acid group (—PO$_3$H$_2$) or a salt thereof (—PO$_3$MH or —PO$_3$M$_2$ wherein M is an organic or inorganic anion), a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group, b1 and b2 are each independently an integer from 1 to 3, and two or more $R_1$ are the same or different from one another when b1 is 2 or greater, and two or more $R_2$ are the same or different from one another when b2 is 2 or greater, and in Formula 1-4, $R_{21}$ and $R_{22}$ are each independently hydrogen, deuterium (D or $^2$H), —F, —Cl, —Br, —I, a hydroxyl group (—OH), a cyano group (—CN), a nitro group (—NO$_2$), an amino group (—NH$_2$), an amidino group (—C(=NH)NH$_2$), a hydrazine group (—NHNH$_2$), a hydrazone group (=N—NH$_2$), a carboxylic acid group (—C(=O)OH) or a salt thereof (—C(=O)OM) wherein M is an organic or inorganic anion), a sulfonic acid group (—SO$_3$H$_2$) or a salt thereof (—SO$_3$MH or —SO$_3$M$_2$ wherein M is an organic or inorganic anion), a phosphoric acid (—PO$_3$H$_2$), a phosphoric acid group (—PO$_3$H$_2$) or a salt thereof (—PO$_3$MH or —PO$_3$M$_2$ wherein M is an organic or inorganic anion), a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group, b21 and b22 are each independently an integer from 0 to 3, and two or more $R_{21}$ are the same or different from one another when b21 is 2 or greater, and two or more $R_{22}$ are the same or different from one another when b22 is 2 or greater, $Z_1$ and $Z_2$ are each independently an electron withdrawing group, c1 and c2 are each independently an integer of 1 to 4, the sum of b21 and c1 is 4, the sum of b22 and c2 is 4, * is a binding site to $L_1$ in Formulae 1a and 1b, and *' is a binding site to $L_2$ in Formula 1b.

In an embodiment, in Formula 1a, $L_1$ may be a single bond, a methylene group, an ethylene group, a propylene group, a butylene group, or a pentylene group; or a methylene group, an ethylene group, a propylene group, a butylene group, or a pentylene group, each of which is substituted with at least one of deuterium, a halogen, and a $C_1$-$C_5$ alkyl group. However, an embodiment is not limited thereto.

For example, $L_1$ of Formula 1a may be a single bond, a methylene group, an ethylene group, and a propylene group. For example, $L_1$ may be a single bond.

In Formulae 1a and 1b, a1 and a2, which refer to the number of $L_1$ and the number of $L_2$, respectively, may each independently be an integer from 1 to 5. Two or more $L_1$ may be the same or different from one another when a1 is 2 or greater. Similarly, two or more $L_2$ may be the same or different from each other when a2 is 2 or greater.

In Formulae 1a and 1b, $CY_1$ may be a group represented by Formula 1-2 or Formula 1-4, and $CY_2$ may be a group represented by Formula 1-3.

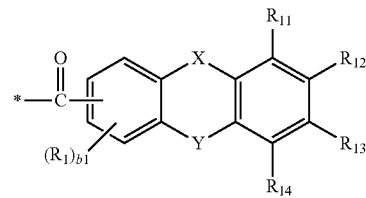

Formula 1-2

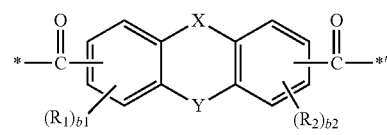

Formula 1-3

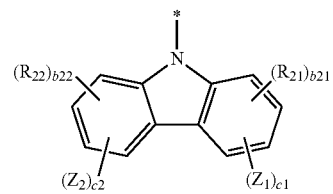

Formula 1-4

In Formulae 1-2 and 1-3, X and Y may each independently be O or S, and in an embodiment, X and Y may be the same. For example, X and Y may both be O. For example, X and Y may both be S.

In an embodiment, X and Y may be different from one another. For example, X may be O, and Y may be S. For example, X may be S, and Y may be O.

In Formulae 1-2 and 1-3, $R_1$, $R_2$ and $R_{11}$ to $R_{14}$ may each independently be hydrogen, deuterium, —F, —Cl, —Br, —I, a hydroxyl group, a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group.

In an embodiment, $R_1$ and $R_2$ may each independently be hydrogen, deuterium, —F, —Cl, —Br, —I, a cyano group, a nitro group, a carboxylic acid group or a salt thereof, a sulfonic acid group or a salt thereof, a phosphoric acid group or a salt thereof, a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group; or a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group, each of which may be substituted with at least one of deuterium, —F, —Cl, —Br, —I, a cyano group, a nitro group, a carboxylic acid group or a salt thereof, a sulfonic acid group or a salt thereof, or a phosphoric acid group or a salt thereof.

For example, $R_1$ and $R_2$ may each independently be hydrogen, deuterium, —F, —Cl, —Br, —I, a cyano group, a nitro group, a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group; or a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group, each of which is substituted with at least one of deuterium, —F, —Cl, —Br, —I, a cyano group, or a nitro group.

For example, $R_1$ and $R_2$ may each independently be hydrogen, a methyl group, an ethyl group, an n-propyl group, an iso-propyl group, an n-butyl group, an isobutyl group, a sec-butyl group, or a tert-butyl group.

In an embodiment, $R_1$ and $R_2$ may both be hydrogen.

In Formulae 1-2 and 1-3, b1 and b2, which indicate the number of $R_1$ groups and the number of $R_2$ groups, respectively, may each independently be an integer from 1 to 3. Two or more $R_1$ groups may be the same or different from one another when b1 is 2 or greater, and two or more $R_2$ groups may be the same or different from one another when b2 is 2 or greater.

In an embodiment, the group represented by Formula 1-2 may be a group represented by at least one of Formulae 1-2-1, Formula 1-2-2, Formula 1-2-3, or Formula 1-2-4.

1-2-1
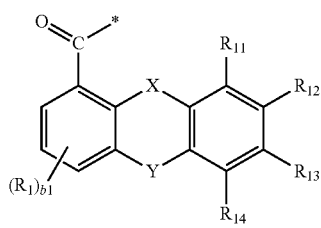

1-2-2
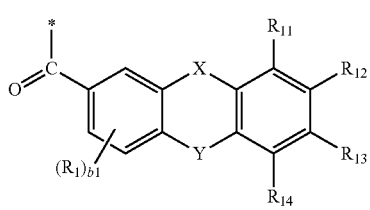

1-2-3
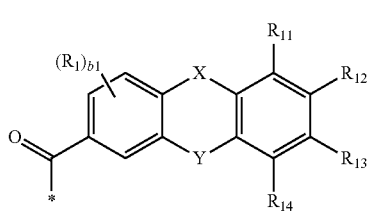

1-2-4
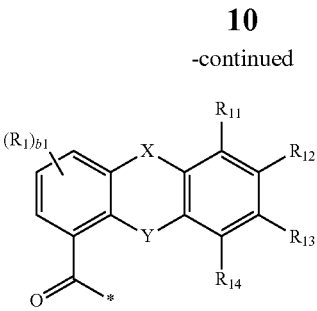

In Formula 1-2-1, Formula 1-2-2, Formula 1-2-3, or Formula 1-2-4, $R_1$, $b_1$, $R_{11}$ to $R_{14}$ are defined the same as described above.

In an embodiment, the group represented by Formula 1-3 are groups represented by Formula 1-3-1, Formula 1-3-2, Formula 1-3-3, Formula 1-3-4, Formula 1-3-5, Formula 1-3-6, Formula 1-3-7, or Formula 1-3-8.

1-3-1
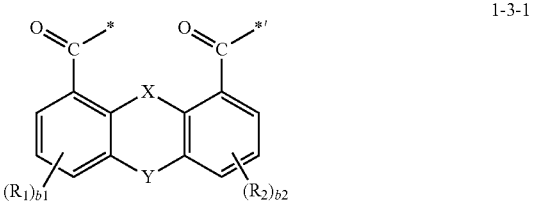

1-3-2
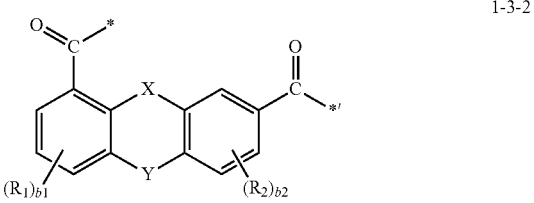

1-3-3
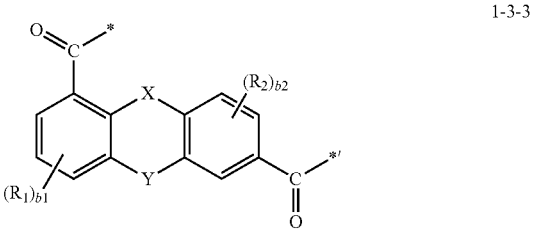

1-3-4
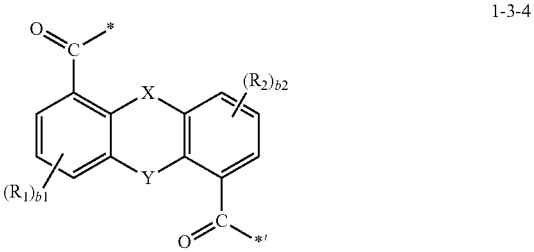

1-3-5
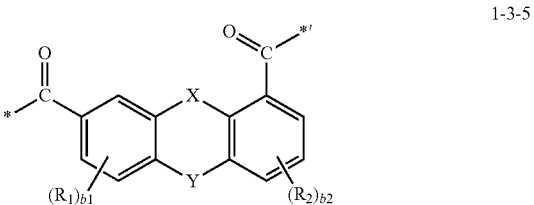

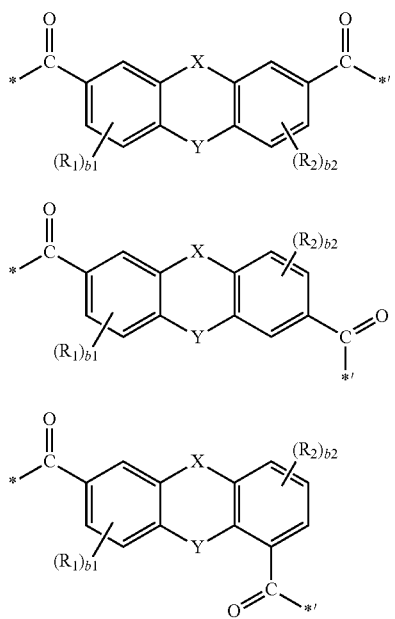

In Formula 1-3-1, Formula 1-3-2, Formula 1-3-3, Formula 1-3-4, Formula 1-3-5, Formula 1-3-6, Formula 1-3-7, or Formula 1-3-8, $R_1$, $R_2$, b1, and b2 are defined the same as described above.

In Formula 1-4, $R_{21}$ and $R_{22}$ may each independently be hydrogen, deuterium, —F, —Cl, —Br, —I, a hydroxyl group, a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group.

In an embodiment, $R_{21}$ and $R_{22}$ may each independently be hydrogen, deuterium, —F, —Cl, —Br, —I, a cyano group, a nitro group, a carboxylic acid group or a salt thereof, a sulfonic acid group or a salt thereof, a phosphoric acid group or a salt thereof, a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group; or a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group, each of which is substituted with at least one of deuterium, —F, —Cl, —Br, —I, a cyano group, a nitro group, a carboxylic acid group or a salt thereof, a sulfonic acid group or a salt thereof, or a phosphoric acid group or a salt thereof.

For example, $R_{21}$ and $R_{22}$ may each independently be hydrogen, deuterium, —F, —Cl, —Br, —I, a cyano group, a nitro group, a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group; or a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group, each of which is substituted with at least one of deuterium, —F, —Cl, —Br, —I, a cyano group, or a nitro group.

For example, $R_{21}$ and $R_{22}$ may each independently be hydrogen, deuterium, —F, —Cl, —Br, —I, a methyl group, an ethyl group, an n-propyl group, an iso-propyl group, an n-butyl group, an isobutyl group, a sec-butyl group, or a tert-butyl group. For example, $R_{21}$ and $R_{22}$ may both be hydrogen.

In Formula 1-4, b21 and b22, which indicate the number of $R_{21}$ groups and the number of $R_{22}$ groups, respectively, may each independently be an integer from 0 to 3. Two or more $R_{21}$ groups may be the same or different from one another when b21 is 2 or greater, and two or more $R_{22}$ groups may be the same or different from one another when b22 is 2 or greater.

In Formula 1-4, $Z_1$ and $Z_2$ may each independently be an electron withdrawing group. As used herein, the term "electron withdrawing group" refers to a group withdraws electron density from a ring or ring system by resonance or an inductive effect. The electron withdrawing group may bind to a conjugated π-electron-containing ring (system). Examples of the electron withdrawing group may include a halogen atom, an amide group, an ester group, an acyl chloride group, a carboxylic acid group, a ketone group, an aldehyde group, an ammonium group, a nitro group, a cyano group, a halogen-substituted alkyl group, or the like.

In an embodiment, $Z_1$ and $Z_2$ may each independently be —F, —Cl, —Br, or —I. However, embodiments are not limited thereto.

In an embodiment, $Z_1$ and $Z_2$ may be the same. For example, $Z_1$ and $Z_2$ may both be —F. For example, $Z_1$ and $Z_2$ may both be —Cl. For example, $Z_1$ and $Z_2$ may both be —Br. For example, $Z_1$ and $Z_2$ may both be —I.

In an embodiment, $Z_1$ and $Z_2$ may be different from one another. For example, $Z_1$ may be —F, and $Z_2$ may be —Cl, —Br, or —I. For example, $Z_1$ may be —Cl, and $Z_2$ may be —F, —Br, or —I. For example, $Z_1$ may be —Br, and $Z_2$ may be —F, —Cl, or —I. For example, $Z_1$ may be —I, and $Z_2$ may be —F, —Cl, or —Br.

In Formula 1-4, c1 and c2 may each independently be an integer from 1 to 4. In an embodiment, c1 and c2 may each independently be an integer of 1 or 2. For example, c1 and c2 may both be 1.

In Formula 1-4, the sum of b21 and c1 may be equal to 4, and the sum of b22 and c2 may be equal to 4. For example, b21 may be 3, and c1 may be 1. For example, b22 may be 3 and c2 may be 1. However, embodiments are not limited thereto.

In an embodiment, (i) b21 may be 3, $R_{21}$ may be hydrogen, c1 may be 1, and $Z_1$ may be —F, —Cl, —Br, and —I, (ii) b22 may be 3, $R_{22}$ may be hydrogen, c1 may be 1, and $Z_2$ may be —F, —Cl, —Br, and —I. However, the disclosed embodiment is not limited thereto.
In an embodiment, the group represented by Formula 1-4 may be a group represented by Formula 1-4-1, Formula 1-4-2, Formula 1-4-3, Formula 1-4-4, Formula 1-4-5, Formula 1-4-6, Formula 1-4-7, Formula 1-4-8, Formula 1-4-9, Formula 1-4-10, Formula 1-4-11, Formula 1-4-12, Formula 1-4-13, Formula 1-4-14, Formula 1-4-15, or Formula 1-4-16.
1-4-1
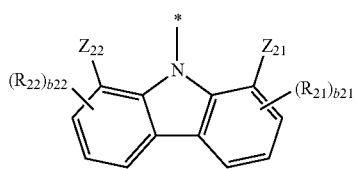
1-4-2
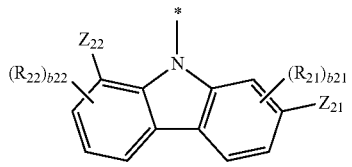
1-4-3
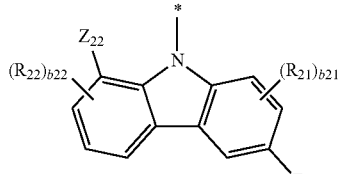
1-4-4
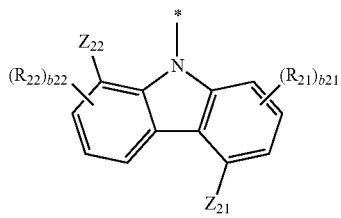
1-4-5
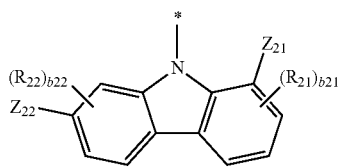
1-4-6
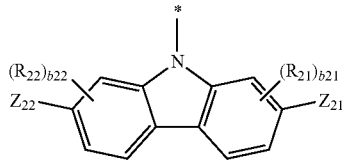
1-4-7
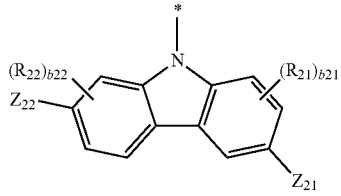
1-4-8
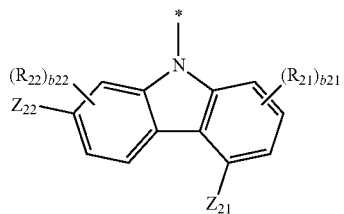
1-4-9
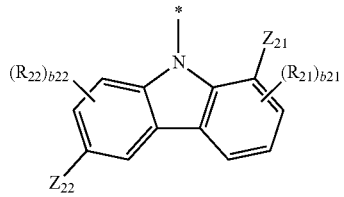
1-4-10
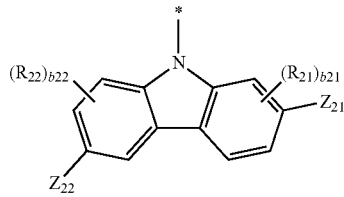
1-4-11
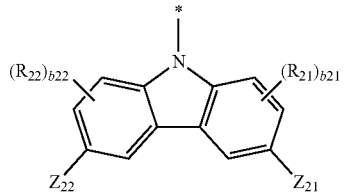
1-4-12
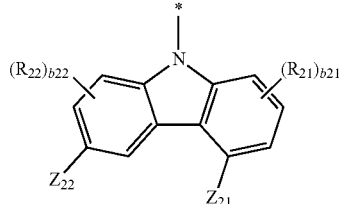
1-4-13
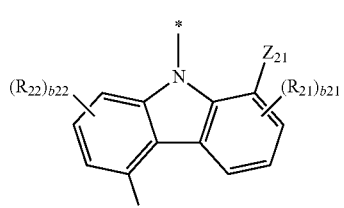
1-4-14
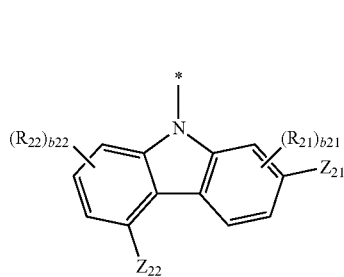

1-4-15

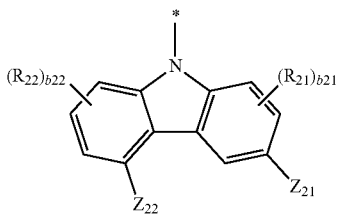

1-4-16

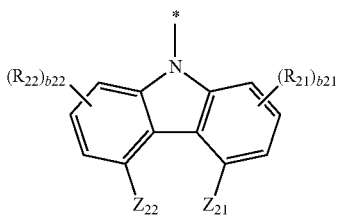

In any of Formula 1-4-1 to Formula 1-4-16, $R_{21}$, $R_{22}$, b21, and b22 is defined the same as described above, and $Z_{21}$ and $Z_{22}$ is defined the same as $Z_1$ and $Z_2$, respectively, as described above.

In an embodiment, the polymer may include a repeating unit represented by at least one of Formula 1a-1 Formula 1a-2, Formula 1a-3, or Formula 1b-1.

1a-1

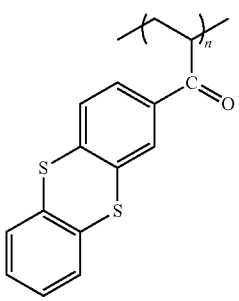

1a-2

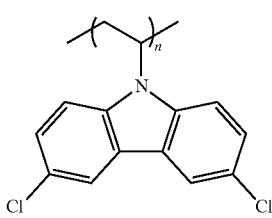

1a-3

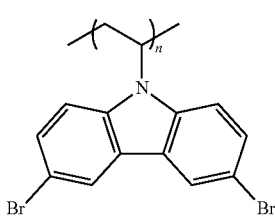

1b-1

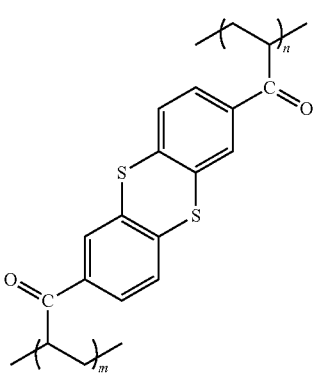

In Formula 1a-1, Formula 1a-2, Formula 1a-3 or Formula 1b-1, m and n may each independently be an integer from 2 to 10,000.

According to an embodiment, the polymer including a repeating unit represented by at least one of Formula 1a or 1b may have a structure in which a ketone group connects the hydrocarbon backbone and a hetero group, allowing a hetero ring at the side chain to freely rotate, reducing electron density in the hetero ring due to the ketone group serving as an electron withdrawing group, and consequently increasing an oxidation-reduction potential of the polymer. Similarly, a carbazole group represented by Formula 1-4 may be bonded to the hydrocarbon backbone in a pendant form, such that the carbazole group is free to rotate at the side chain, and, due to substitution of a halogen group serving as a strong electron withdrawing group, electron density in the carbazole group is reduced, and the oxidation-reduction potential of the polymer may be increased.

As used herein, the term "polymer" refers to a polymerized compound including at least two or more repeating groups represented by Formula 1a or 1b, including, for example, a dimer or an oligomer. For example, the polymer may have an average molecular weight of about 400 Daltons to about 100,000 Daltons. However, the average molecular weight of the polymer is not limited thereto, and may be appropriately varied.

According to another aspect of the inventive concept, a composite positive active material includes a metal oxide; and the polymer according to any of the above-described embodiments.

In an embodiment, the metal oxide may have an oxidation-reduction potential of about 3.7 V to about 4.6 V. For example, the metal oxide may have an oxidation-reduction potential of about 3.75 V to about 4.55 V, or about 3.8 V to about 4.5 V, each versus Li/Li$^+$.

In an embodiment, the metal oxide may include a composite oxide of lithium with a metal, a transition metal, a metalloid, or a combination thereof.

For example, the metal oxide may be represented by Formula 2.

$$Li_aA_bO_c \qquad \text{Formula 2}$$

In Formula 2, A may be at least one of nickel (Ni), cobalt (Co), manganese (Mn), vanadium (V), magnesium (Mg), gallium(Ga), silicon (Si), tungsten (W), molybdenum (Mo), iron (Fe), chromium (Cr), copper (Cu), zinc (Zn), titanium (Ti), aluminum (Al), or boron (B). For example, $0.9 \leq a \leq 1.1$, $0.98 \leq b \leq 1.00$, and $1.9 \leq c \leq 2.1$.

For example, the metal oxide may be at least one of $LiCoO_2$, $LiNi_{0.7}Co_{0.2}Mn_{0.1}O_2$, $LiNi_{0.88}Co_{0.08}Mn_{0.04}O_2$, $LiNi_{0.8}Co_{0.15}Mn_{0.05}O_2$, $LiNi_{0.8}Co_{0.1}Mn_{0.1}O_2$, $LiNi_{0.88}Co_{0.1}Mn_{0.02}O_2$, $LiNi_{0.8}Co_{0.15}Al_{0.05}O_2$, $LiNi_{0.8}Co_{0.1}Al_{0.1}O_2$, or $LiNi_{0.88}Co_{0.1}Al_{0.02}O_2$. In an embodiment, the metal oxide may be $Li_xMn_2O_4$ (wherein 1<x<2), $LiMSiO_4F$ (wherein M may be at least one of Co, Fe, Mn, or Ni), or $LiM'PO_4F$ (wherein M' may be at least one of Co, Fe, Mn, or Ni).

In an embodiment, at least part of a surface of the metal oxide may be covered with the polymer according to the above-described embodiment. For example, the entire surface of the metal oxide may be covered with the polymer. Accordingly, the metal oxide may form a core, while the polymer may constitute a shell covering the surface of the metal oxide. Accordingly, direct contact between the metal oxide and an external material, for example, a liquid electrolyte may be prevented, and deterioration of the metal oxide and a side reaction may be suppressed, thus leading to improved cycle characteristics of a battery. On the other hand, due to a crystalline structure of the metal, migration of lithium ions in the metal oxide may slow. However, when a polymer coating layer including the polymer according to the disclosed embodiment is on the surface of the metal oxide, the polymer may serve as a migration path of lithium ions and improve the migration speed of the lithium ions. Therefore, an electrode including the composite positive active material according to the disclosed embodiment may ensure high-rate charging of a lithium secondary battery.

In an embodiment, an oxidation-reduction potential of the polymer may be greater than an oxidation-reduction potential of the metal oxide. For example, the polymer may have an oxidation-reduction potential of greater than 3.7 volts (V), e.g., about 3.8 V or greater, about 3.9 V or greater, or about 4.0 V or greater, e.g., 3.75 V to 6 V, 3.8 V to 5.8 V, 3.9 V to 5.6 V, or 4.0 V to 5.4 V, versus $Li/Li^+$.

Since the polymer according to the disclosed embodiment has an oxidation-reduction potential which is greater than the oxidation-reduction potential of the metal oxide, oxidation or reduction of the polymer may not occur at a charge voltage of the metal oxide, so that the polymer may not be decomposed and may serve as a migration path of lithium ions. Accordingly, the polymer according to the disclosed embodiment may serve as an effective lithium ion transfer medium during high-rate charging, and consequently rapid charging of a lithium secondary battery.

In an embodiment, the polymer may be inactive with respect to lithium, e.g., not be reduced when in contact with lithium, and not be oxidized or reduced at a potential of 0 V to 5 V, 0.2 V to 4.9 V, 0.4 V to 4.8 V, or 1 V to 4.7 V, versus $Li/Li^+$. For example, the polymer may be an electrical insulator, e.g., have an electrical conductivity of $10^{-9}$ Siemens per centimeter (S/cm) to $10^{-5}$ S/cm, or less, and have an ionic conductivity for lithium of $10^{-8}$ S/cm to $10^{-4}$ S/cm, or $10^{-7}$ S/cm to $10^{-3}$ S/cm. The polymer may serve as a lithium ion transfer medium. Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989. The electrical conductivity may be determined by an eddy current method or a kelvin bridge method. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation.

In an embodiment, an amount of the polymer may be about 40 weight percent (wt %) or less, based on a total weight of the composite positive active material. For example, the amount of the polymer may be about 39 wt % or less, about 38 wt % or less, about 37 wt % or less, about 36 wt % or less, about 35 wt % or less, about 34 wt % or less, about 33 wt % or less, about 32 wt % or less, about 31 wt % or less, about 30 wt % or less, about 29 wt % or less, about 28 wt % or less, about 27 wt % or less, about 26 wt % or less, about 25 wt % or less, about 24 wt % or less, about 23 wt % or less, about 22 wt % or less, about 21 wt % or less, about 20 wt % or less, about 19 wt % or less, about 18 wt % or less, about 17 wt % or less, about 16 wt % or less, about 15 wt % or less, about 14 wt % or less, about 13 wt % or less, about 12 wt % or less, about 11 wt % or less, or about 10 wt % or less, based on a total weight of the composite positive active material. For example, the amount of the polymer may be about 1 wt % or greater, about 2 wt % or greater, about 3 wt % or greater, about 4 wt % or greater, or about 5 wt % or greater, based on a total weight of the composite positive active material. For example, the amount of the polymer may be about 1 wt % to about 40 wt %, about 1 wt % to about 35 wt %, about 1 wt % to about 30 wt %, about 1 wt % to about 25 wt %, about 1 wt % to about 20 wt %, about 1 wt % to about 15 wt %, or about 1 wt % to about 10 wt %, based on a total weight of the composite positive active material. However, embodiments are not limited thereto. The amount of the polymer may be within any suitable combination of the above-described amount ranges.

In an embodiment, the weight of the metal oxide may be greater than the weight amount of the polymer. For example, a weight ratio of the metal oxide to the polymer may be about 3:1 to about 9:1, about 4:1 to about 8:1, or about 6:1 to about 9:1.

The metal oxide may have a greater capacity than the polymer. Accordingly, to provide improved capacity, it is desirable that the amount, e.g., weight, of the metal oxide is greater than the amount of the polymer. However, when the amount of the metal oxide is excessive relative to the amount of the polymer, the capacity may be increased, whereas the charge rate may become low due to an increased content of a crystalline structure of the metal oxide. Also, when the amount of the polymer is excessive relative to the amount of the metal oxide, the charge rate may be improved due to a reduced content of the crystalline structure of the metal oxide, whereas the capacity may be reduced. Accordingly, when the amounts of the metal oxide and the polymer are within the above-described ranges, a lithium secondary battery including a rapidly chargeable, high-capacity electrode may be implemented.

In an embodiment, the composite positive active material may further include a conducting agent. The conducting agent may be any suitable conducting agent known in the art available for lithium secondary batteries. This will be further described later in detail. According to an aspect, a lithium secondary battery includes: a positive electrode including the composite positive active material; a negative electrode; and an electrolyte.

A specific capacity of the lithium secondary battery (capacity per unit weight in grams (g) of the lithium secondary battery) after charging at a charge rate of 5 C may be about 65 milliAmpere-hours per gram (mAh/g) or greater, about 66 mAh/g or greater, about 67 mAh/g or greater, about 68 mAh/g or greater, about 69 mAh/g or greater, about 70 mAh/g or greater, about 73 mAh/g or greater, about 75 mAh/g or greater, about 78 mAh/g or greater, about 80 mAh/g or greater, about 83 mAh/g or greater, about 85 mAh/g or greater, or about 87 mAh/g or greater, e.g., 65 mAh/g to 200 mAh/g. The lithium secondary battery may provide such a high capacity and have a high output.

A type of the lithium secondary battery is not specifically limited. For example, the lithium secondary battery may be a lithium-ion battery, a lithium-ion polymer battery, a lithium sulfur battery, or the like.

The lithium secondary battery according to an embodiment may be manufactured in the following method.

First, a positive electrode may be prepared.

For example, the composite positive active material according to an embodiment, a conducting agent, a binder, and a solvent may be mixed together to prepare a positive active material composition. The positive active material composition may be directly coated on a positive electrode current collector and then dried to obtain a positive electrode having a positive active material film. In some other embodiments, the positive active material composition may be cast on a separate support to form a positive active material film. This positive active material film may then be separated from the support and laminated on a positive electrode current collector, thereby obtaining a positive electrode having the positive active material film thereon. The positive electrode is not limited to the above-described forms, and may have any of a variety of forms.

The conducting agent is not specifically limited and may be any suitable material which does not cause undesirable chemical changes in the lithium battery and has suitable conductivity. Examples of the conducting agent may include graphite, such as natural graphite or artificial graphite; carbon black such as acetylene black, ketjen black, channel black, furnace black, lamp black, or thermal black; conductive fibers such as carbonaceous fibers or metal fibers; fluorinated carbon; metal powder such as aluminum powder, nickel powder, and the like; conducive whiskers such as zinc oxide, potassium titanate, and the like; a conductive metal oxide such as a titanium oxide, or the like; and a conductive material such as a polyphenylene derivative. However, embodiments are not limited thereto, and any conducting agent available in the art may be used. An amount of the conducting agent may be, for example, about 1 wt % to about 20 wt %, based on a total weight of the positive active material composition.

The binder may facilitate binding of the positive active material with an additive such as the conducting agent and a current collector. Examples of the binder may include polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethylene sulfone, polyamide, polyacetal, polyphenylene oxide, polybutylene terephthalate, an ethylene-propylene-diene monomer (EPDM), sulfonated EPDM, a styrene-butadiene rubber (SBR), fluorine rubber, or a copolymer thereof. However, embodiments are not limited thereto. Any suitable binder available in the art may be used. An amount of the binder may be, for example, about 1 wt % to about 30 wt %, based on a total weight of the positive active material composition.

Examples of the solvent may include N-methylpyrrolidone (NMP), acetone, water, or the like. However, embodiments are not limited thereto. Any suitable material available as a solvent in the art may be used. An amount of the solvent may be about 10 parts to about 100 parts by weight with respect to 100 parts by weight of the positive active material. The inclusion of the solvent in an amount within this range may facilitate formation of the positive active material film.

The amounts of the composite positive active material, the conducting agent, binder and the solvent may be the levels as commonly used in lithium batteries in the art. At least one of the conducting agent, the binder, and the solvent may be omitted depending on the use and structure of a lithium battery.

In an embodiment, the positive electrode may further include a commercially available positive active material, in addition to any of the above-described composite positive active materials.

The positive active material may comprise a lithium-containing metal oxide. Any suitable lithium-containing metal oxide used in the art may be used. For example, the lithium-containing metal oxide may be at least one composite oxide of lithium with cobalt, manganese, nickel, or a combination thereof. For example, the lithium-containing metal oxide may be a compound represented by one of the following formula: $Li_aAl_{1-b}B'_bD'_2$ (wherein $0.90 \leq a \leq 1$, and $0 \leq b \leq 0.5$); $Li_aE_{1-b}B'_bO_{2-c}D'_c$ (wherein $0.90 \leq a \leq 1$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, or $0.001 \leq b \leq 0.1$); $QO_2$; $QS_2$; $LiQS_2$; $V_2O_5$; $LiV_2O_5$; $LiMO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulas, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D' may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; M may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as positive active materials may have a surface coating layer (hereinafter, also referred to as "coating layer"). Alternatively, a mixture of a compound without a coating layer and a compound having a coating layer, the compounds being at least one of the compounds listed above, may be used. In some embodiments, the coating layer may include at least one of an oxide, a hydroxide, an oxyhydroxide, an oxycarbonate, and a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the positive active material when a compound of the coating element is used. For example, the coating layer may be formed using a spray coating method, or a dipping method. The coating methods may be well understood by one of ordinary skill in the art, and thus a detailed description thereof will be omitted.

For example, the positive electrode current collector may have a thickness of about 3 micrometers (μm) to about 50 μm. The positive electrode current collector is not specifically limited. Any suitable current collector which does not cause an undesirable chemical change in a lithium battery and has suitable conductivity may be used. Examples of the positive electrode current collector may include stainless steel, aluminum, nickel, titanium, calcined carbon, and aluminum or stainless steel that is surface-treated with carbon, nickel, titanium, or silver. The positive electrode current collector may have an uneven microstructure on its surface to enhance the strength of binding to the cathode active material. The positive electrode current collector may be in any of a variety of forms, including a film, a sheet, a foil, a net, a porous structure, a foam, and a non-woven fabric.

A loading level of the positive active material composition may be, for example, about 30 milligrams per square centimeter (mg/cm$^2$) or greater, about 35 mg/cm$^2$ or greater, or about 40 mg/cm$^2$ or greater. For example, the positive electrode may have a density of 3 g/cc or greater or 3.5 g/cc or greater. For a design focused on energy density, a loading level of the positive active material composition may be about 35 mg/cm$^2$ or greater to about 50 mg/cm$^2$ or less, and a density of the positive electrode may be about 3.5 g/cc or greater to about 4.2 g/cc or less. For example, a double-side coated positive electrode may have a loading level of about 37 mg/cc and a density of about 3.6 g/cc.

Next, a negative electrode may be prepared.

For example, a negative active material, a conducting agent, a binder, and a solvent may be mixed together to prepare a positive active material composition. The negative active material composition may be directly coated on a negative electrode current collector and then dried to obtain a negative electrode having a negative active material film. In some other embodiments, the negative active material composition may be cast on a separate support to form a negative active material film. This negative active material film may then be separated from the support and laminated on a negative electrode current collector, thereby obtaining a negative electrode having the negative active material film. The negative electrode is not limited to the above-described forms, and may have any of a variety of forms.

For example, the negative active material may be a silicon-based compound, a silicon oxide (SiO$_x$, wherein 0<x<2), or a composite of a silicon-based compound and a carbonaceous material, wherein a size of silicon particles may be about 300 nm or less, for example, about 10 nm to about 250 nm. The term "size" used herein may refer to an average particle diameter when the silicon particles are spherical or may refer to an average length of the major axes when the silicon particles are non-spherical.

The carbonaceous material may be crystalline carbon, amorphous carbon, or a mixture thereof. The crystalline carbon may be, for example, graphite such as natural graphite or artificial graphite in amorphous, plate-like, flake-like, spherical or fibrous form. The amorphous carbon may be soft carbon (carbon sintered at low temperatures), hard carbon, meso-phase pitch carbides, sintered cokes, or the like.

The composite of a silicon compound and a carbonaceous material may be, for example, a composite including silicon particles on graphite or a composite including silicon particles on and in graphite. For example, the composite may be an active material obtained by dispersing silicon (Si) particles having an average particle diameter of about 200 nm or less, for example, about 100 nm to 200 nm, and for example, about 150 nm, on graphite particles and coating carbon thereon, or an active material including silicon (Si) particles on and in graphite. These composites are available under the product name "SCN1" (Si particles on graphite) or "SCN2" (Si particles inside as well as on graphite). SCN1 is an active material obtained by dispersing Si particles having an average particle diameter of about 150 nm on graphite particles and coating carbon thereon. SCN2 is an active material including Si particles having an average particle diameter of about 150 nm on and inside graphite.

In an embodiment, the negative active material may further include a commercially available negative active material, in addition to any of the above-described negative active material.

The commercially available negative active material available in the art may be, for example, Si, Sn, Al, Ge, Pb, Bi, Sb, a Si—Y' alloy (wherein Y' may be an alkali metal, an alkaline earth metal, a Group 13 to Group16 element, a transition metal, a transition metal oxide, a rare earth element, or a combination thereof, and Y' is not Si), an Sn—Y' alloy (wherein Y' may be an alkali metal, an alkaline earth metal, a Group 13 to Group 16 element, a transition metal, a rare earth element, or a combination thereof, and Y' is not Sn), or the like. In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. For example, the common negative active material may be a metal oxide, for example, a lithium titanium oxide, a vanadium oxide, a lithium vanadium oxide, or the like.

The conducting agent and the binder used in the negative active material composition may be the same as those used in the positive active material composition, or at least one of the above-listed examples of the conducting agent and the binders for the positive active material composition.

The amounts of the negative active material, the conducting agent, the binder and the solvent may be determined by one of skill in the art of lithium batteries without undue experimentation. At least one of the conducting agent, the binder, and the solvent may be omitted depending on the use and structure of a lithium battery.

The negative active material composition may include water as the solvent. For example, the negative active material composition may include water as the solvent; carboxymethylcellulose (CMC), a styrene-butadiene rubber (SBR), an acrylate-based polymer, a methacrylate-based polymer, and/or alginate (AG) as the binder; and carbon black, acetylene black, and/or graphite as the conducting agent. For example, the negative electrode may be manufactured by mixing about 94 wt % of a negative active material, about 3 wt % of a binder, and about 3 wt % of a conducting agent to obtain a mixture in powder form, adding water to the mixture to prepare a slurry having a solid content of about 70 wt %, and coating, drying and then roll-pressing the slurry.

For example, the negative electrode current collector may have a thickness of about 3 micrometers (um) to about 50 micrometers (um). The negative electrode current collector is not specifically limited. Any suitable current collector which does not cause a chemical change in a lithium battery may be used. Examples of the negative electrode current collector may include copper, stainless steel, aluminum, nickel, titanium, calcined carbon; copper or stainless steel which is surface-treated with carbon, nickel, titanium, silver, or the like; and an aluminum-cadmium alloy. Like the positive electrode current collector, the positive electrode current collector may have an uneven microstructure on its surface to enhance a binding strength with the negative active material. The negative electrode current collector may be in any of a variety of forms, including a film, a sheet, a foil, a net, a porous structure, a foam, and a non-woven fabric.

A loading level of the negative active material composition may be determined depending on the loading level of the positive active material composition. A loading level of the negative active material composition may be, based on capacity per gram, about 12 mg/cm$^2$ or greater, about 15 mg/cm$^2$ or greater, about 18 mg/cm$^2$ or greater, or about 21 mg/cm$^2$ or greater. The negative electrode may have a density of about 1.5 grams per cubic centimeter (g/cc) or greater, for example, about 1.6 g/cc or greater. For a design focused on energy density, a density of the negative electrode may be about 1.65 g/cc or greater to about 1.9 g/cc or less.

When a loading level of the negative active material and a density of the negative electrode are within these ranges, a lithium battery including the negative active material may have a high cell energy density of about 500 Watt-hours per liter (Wh/L) or greater.

Next, a separator to be interposed between the positive electrode and the negative electrode may be prepared.

The separator may be any separator commonly used in lithium batteries. The separator may have low resistance to migration of ions in an electrolyte and excellent electrolyte-retaining ability. For example, the separator may be glass fiber, polyester, Teflon, polyethylene, polypropylene, polytetrafluoroethylene (PTFE), or a combination thereof, which may be a non-woven or woven fabric. For example, a windable separator such as polyethylene or polypropylene may be used for a lithium-ion battery. A separator with good electrolyte-retaining ability may be used for a lithium-ion polymer battery.

For example, the separator may be manufactured in the following manner.

A polymer resin, a filler, and a solvent may be mixed together to prepare a separator composition. The separator composition may be directly coated on an electrode and then dried to form the separator. In some other embodiments, the separator composition may be cast on a support and then dried to form a separator film. This separator film may be separated from the support and laminated on an electrode to thereby form the separator.

The polymer resin used in preparing the separator is not specifically limited. Any material available as a binder for an electrode plate may be used. For example, the polymer resin may be a vinylidenefluoride/hexafluoropropylene copolymer, polyvinylidene fluoride (PVDF), polyacrylonitrile, polymethylmethacrylate, or a mixture thereof.

Next, an electrolyte is prepared. The electrolyte may be an organic electrolyte. For example, the electrolyte may include an organic solid electrolyte, and/or an inorganic solid electrode, in addition to the organic liquid electrolyte.

The organic solid electrolyte may be, for example, a polyethylene derivative, a polyethylene oxide derivative, a polypropylene oxide derivative, a phosphoric acid ester polymer, polyester sulfide, a polyvinyl alcohol, polyvinylidene fluoride, a polymer containing an ionic dissociation group, or the like.

The inorganic solid electrolyte may be, for example, $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, $Li_3PO_4$—$Li_2S$—$SiS_2$, or the like.

Referring to FIG. 1, a lithium secondary battery according to an embodiment may include a positive electrode 3, a negative electrode 2, and a separator 4. The positive electrode 3, the negative electrode 2, and the separator 4 may be would or folded, and then accommodated in a battery base 5. Then, the battery case 5 may be filled with an electrolyte and sealed with a cap assembly 6, thereby completing the manufacture of the lithium secondary battery 1. The battery case 5 may be a cylindrical type, or may be, although not illustrated, a rectangular type, a thin film type, or a coin type. The lithium secondary battery may be, for example, a large, thin-film type battery or a lithium-ion battery.

For example, the separator may be disposed between the positive electrode and the negative electrode to thereby form a battery assembly. In some embodiments, the battery assembly may be stacked in a bi-cell structure and then impregnated with electrolyte. Then, the resulting assembly may be put into a pouch and hermetically sealed to thereby complete the manufacture of a lithium-ion polymer battery.

In some embodiments, a plurality of battery assemblies may be stacked to form a battery pack, which may be used in any device which require high capacity and high output, for example, in a laptop computer, a smart phone, an electric vehicle, or the like.

The lithium secondary battery according to any of the embodiments may be used in any system which is powered to operate by an electric motor, for example, a power tool; an electric vehicle (EV), an hybrid electric vehicle (HEV), or an plug-in hybrid electric vehicle (PHEV); electric bicycles such as E-bike or E-scooter; an electric golf cart; or an electric power storage system.

An embodiment of the disclosure will now be described in detail with reference to the following examples. However, these examples are only for illustrative purposes and are not intended to limit the scope of the disclosed embodiment of the disclosure.

A "hydrocarbyl group" as used herein means a group having the specified number of carbon atoms and the appropriate valence in view of the number of substitutions shown in the structure. Hydrocarbyl groups contain at least carbon and hydrogen, and can optionally contain 1 or more (e.g., 1-8) heteroatoms selected from N, O, S, Si, P, or a combination thereof. Hydrocarbyl groups can be unsubstituted or substituted with one or more substituent groups up to the valence allowed by the hydrocarbyl group independently selected from a C1-30 alkyl, C2-30 alkenyl, C2-30 alkynyl, C6-30 aryl, C7-30 arylalkyl, C1-12 alkoxy, C1-30 heteroalkyl, C3-30 heteroarylalkyl, C3-30 cycloalkyl, C3-15 cycloalkenyl, C6-30 cycloalkynyl, C2-30 heterocycloalkyl, halogen (F, CI, Br, or I), hydroxy, nitro, cyano, amino, azido, amidino, hydrazino, hydrazono, carbonyl, carbamyl, thiol, carboxy (C1-6alkyl) ester, carboxylic acid, carboxylic acid salt, sulfonic acid or a salt thereof, and phosphoric acid or a salt thereof.

"Alkyl" means a straight or branched chain, saturated, monovalent hydrocarbon group (e.g., methyl or hexyl).

"Alkenyl" means a straight or branched chain, monovalent hydrocarbon group having at least one carbon-carbon double bond (e.g., ethenyl (—HC=CH$_2$)).

"Alkynyl" means a straight or branched chain, monovalent hydrocarbon group having at least one carbon-carbon triple bond (e.g., ethynyl).

"Alkylene" means a straight, branched or cyclic divalent aliphatic hydrocarbon group, and may have from 1 to about 18 carbon atoms, more specifically 2 to about 12 carbons. Exemplary alkylene groups include methylene (—CH$_2$—), ethylene (—CH$_2$CH$_2$—), propylene (—(CH$_2$)$_3$—), cyclohexylene (—C$_6$H$_{10}$—), methylenedioxy (—O—CH$_2$—O—), or ethylenedioxy (—O—(CH$_2$)$_2$—O—).

"Alkenylene" means a straight or branched chain, divalent hydrocarbon group having at least one carbon-carbon double bond (e.g., ethenylene (—HC=CH—)).

"Alkynylene" means a straight or branched chain divalent aliphatic hydrocarbon that has one or more unsaturated carbon-carbon bonds, at least one of which is a triple bond (e.g., ethynylene).

"Alkoxy" means an alkyl group that is linked via an oxygen (i.e., —O-alkyl). Nonlimiting examples of C1 to C30 alkoxy groups include methoxy groups, ethoxy groups, propoxy groups, isobutyloxy groups, sec-butyloxy groups, pentyloxy groups, iso-amyloxy groups, and hexyloxy groups.

"Cycloalkyl" means a monovalent group having one or more saturated rings in which all ring members are carbon (e.g., cyclopentyl and cyclohexyl).

"Cycloalkenyl" means a monovalent group having one or more rings and one or more carbon-carbon double bond in the ring, wherein all ring members are carbon (e.g., cyclopentyl and cyclohexyl).

"Cycloalkynyl" means a stable aliphatic monocyclic or polycyclic group having at least one carbon-carbon triple bond, wherein all ring members are carbon (e.g., cyclohexynyl).

The term "aryl" refers to a hydrocarbon group having an aromatic ring, and includes monocyclic and polycyclic hydrocarbons wherein the additional ring(s) of the polycyclic hydrocarbon may be aromatic or nonaromatic (e.g., phenyl or napthyl)

The prefix "hetero" means that the compound or group includes at least one a heteroatom (e.g., 1, 2, or 3 heteroatom(s)), wherein the heteroatom(s) is each independently N, O, S, Si, or P.

"Heteroaryl" means a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), P (phosphorus), and sulfur (S).

"Heteroarylalkyl" means a heteroaryl group linked via an alkylene moiety. The specified number of carbon atoms (e.g., C3 to C30) means the total number of carbon atoms present in both the aryl and the alkylene moieties, with remaining ring atoms being heteroatoms as discussed above.

"Aryloxy" means an aryl moiety that is linked via an oxygen (i.e., —O-aryl). An aryloxy group includes a C6 to C30 aryloxy group, and specifically a C6 to C18 aryloxy group. Non-limiting examples include phenoxy, naphthyloxy, and tetrahydronaphthyloxy.

"Arylthio" means an aryl moiety that is linked via a sulfur (i.e., —S-aryl). Examples of arylthio groups include phenylthio, naphthylthio.

EXAMPLES

Preparation Example 1 (Preparation of PTmVK and PTdVK7)

(1) Synthesis of Intermediate

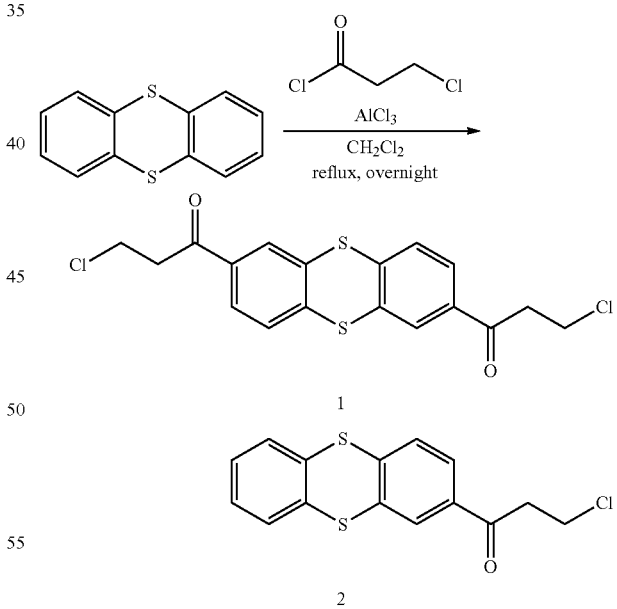

1.00 g (4.62 mol) of thianthrene (available from TCl), 1.23 mL (12.8 mol) of 3-chloropropanoyl chloride, and 2.13 g (16.0 mmol) of AlCl$_3$ were mixed in dichloromethane (CH$_2$Cl$_2$) and then refluxed at about 40° C. overnight to obtain Intermediate compound 1 and Intermediate compound 2. The obtained Intermediate compounds 1 and 2 were analyzed by mass and $^1$H-NMR spectroscopy. The results are shown in Table 1.

(2) Synthesis of Monomer

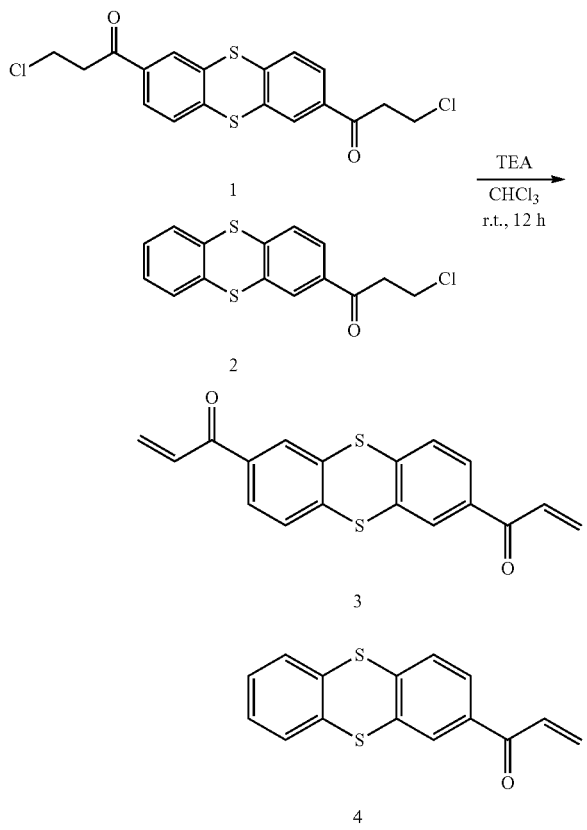

5 g of Intermediate compound 1 and 5 g of Intermediate compound 2 were separately added to 5.4 mL of triethylamine (TEA) and 37 mL of CHCl₃37, and each stirred at room temperature for about 12 hours to obtain compounds 3 and 4, respectively. The obtained compound 3 was analyzed by mass and $^1$H-NMR spectroscopy, and the compound 4 was analyzed by mass, $^1$H-NMR and $^{13}$C-NMR spectroscopy. The results are shown in Table 2.

(3) Synthesis of PTmVK Polymer

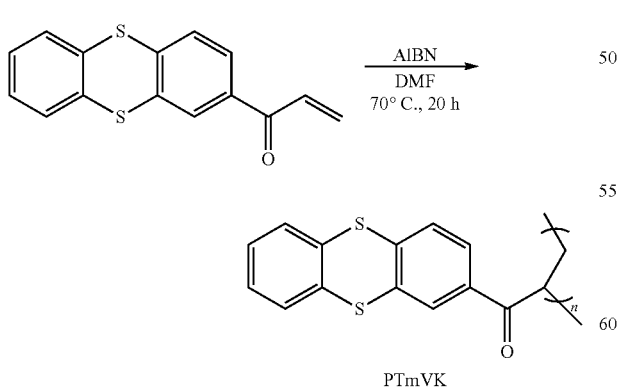

300 mg of the compound 4 and 5.5 mg of AIBN were added to a dimethylformamide (DMF) solvent and stirred at about 70° C. for about 20 hours to obtain a PTmVK polymer.

(4) Synthesis of PTdVK Polymer

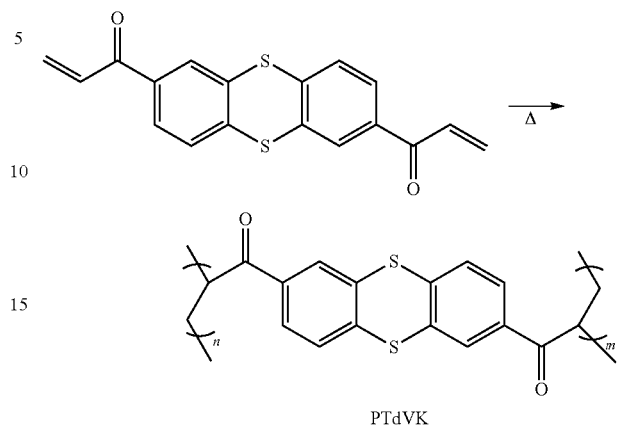

300 g of the compound 3 was heated at about 50° C. to obtain a PTdVK polymer.

TABLE 1

| Compound | 1H-NMR(δ:ppm) | FAB-MS (m/z) |
|---|---|---|
| 1 | 8.02(d, 2H, J = 1.7 Hz, Ph), 7.84(dd, 2H, J = 7.9, 1.7 Hz, Ph), 7.57(d, 2H, J = 8.5 Hz, Ph), 3.91(t, 4H, J = 6.8 Hz, —CH₂—), 3.43(t, 4H, J = 6.8 Hz, —CH₂—) | 396.3(found) 396.0(calcd) |
| 2 | 8.03(d, 1H, J = 2.3 Hz, Ph), 7.81(dd, 1H, J = 8.5, 1.7 Hz, Ph), 7.56(d, 1H, J = 7.9Hz, Ph), 7.51-7.45(m, 2H, Ph), 7.30-7.25(m, 2H, Ph), 3.91(t, 2H, J = 6.8Hz, —CH₂—), 3.42(t, 2H, J = 6.8 Hz, —CH₂—) | 306.1(found) 306.0(calcd) |

TABLE 2

| Compound | 1H-NMR(δ:ppm) | 13C-NMR (δ:ppm) | FAB-MS (m/z) |
|---|---|---|---|
| 3 | 8.03(d, 2H, J = 1.7 Hz, Ph), 7.83(dd, 2H, J = 8.2, 1.7 Hz, Ph), 7.58(d, 2H, J = 7.9 Hz, Ph), 7.11(dd, 2H, J = 17.3, 10.5 Hz, COCH=CH₂), 6.45(dd, 2H, J = 17.0, 1.7 Hz, trans-CH=CH), 5.97(dd, 2H, J = 10.8, 1.7 Hz, cis-CH=CH) | — | 324.2(found) 324.0(calcd) |
| 4 | 8.03(d, 1H, J = 1.7 Hz, Ph), 7.81(dd, 1H, J = 7.9, 1.7Hz, Ph), 7.57(d, 1H, J = 7.9 Hz, Ph), 7.50-7.46(m, 2H, Ph), 7.29-7.26(m, 2H, Ph), 7.11 (dd, 1H, J = 17.0, 10.8 Hz, COCH=CH₂), 6.44(dd, 1H, J = 17.3, 1.4 Hz, trans-CH=CH), 5.95(dd, 1H, J = 10.5, 1.4 Hz, cis-CH=CH) | 189.5, 141.7, 136.6, 136.1, 134.7, 134.3, 131.9, 130.7, 128.9, 128.7, 128.6, 128.2, 128.1, 127.8 | 270.1(found) 270.0(calcd) |

Preparation Example 2

Preparation of PdCVK and PdBVK (1) Synthesis of Intermediate

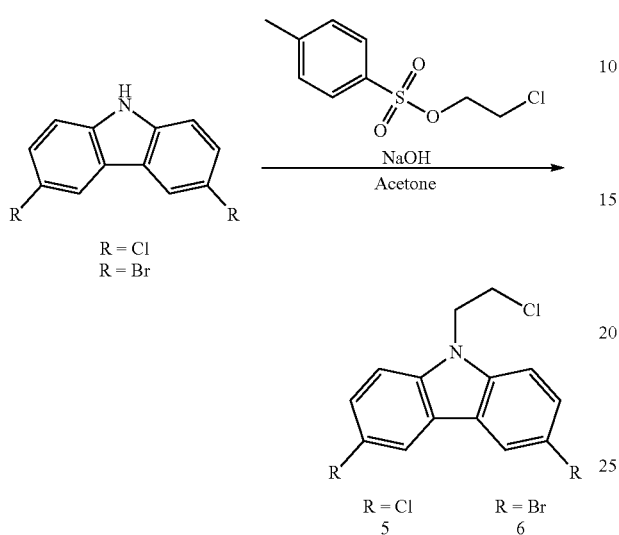

1.42 g (6.0 mol) of 3,6-dichloro-9H-carbazole, 3.65 g (17 mmol) of 2-chloroethyl 4-methylbenzenesulfonate, 0.78 g of NaOH, and 1.2 mL of water were mixed together in an acetone solvent to obtain Intermediate compound 5.

Also, 1.95 g (6.0 mol) of 3,6-dibromo-9H-carbazole, 3.65 g (17 mol) of 2-chloroethyl 4-methylbenzenesulfonate, 0.78 mL of NaOH 0.78 ml, and 1.2 mL of water were mixed together in an acetone solvent to obtain Intermediate compound 6.

(2) Synthesis of Monomer

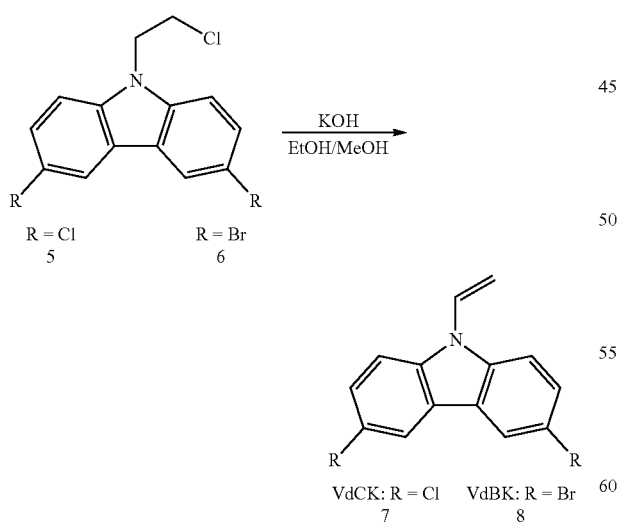

0.77 g (2.6 mmol) of Intermediate compound 5 and 5.28 mL of KOH were mixed in 50 mL of a mixed solvent of EtOH/MeOH (3:2) and stirred at about 80° C. for about 12 hours to obtain compound 7.

Also, 1.0 g (2.6 mol) of compound 6 and 5.28 mL of KOH were mixed in 50 mL of a mixed solvent of EtOH/MeOH (3:2) and stirred at about 80° C. for about 12 hours to obtain compound 8.

The obtained compounds 7 and 8 are analyzed by mass, $^1$H-NMR and $^{13}$C-NMR spectroscopy. The results are shown in Table 3.

(3) Synthesis of PdCVK Polymer and PdBVK Polymer

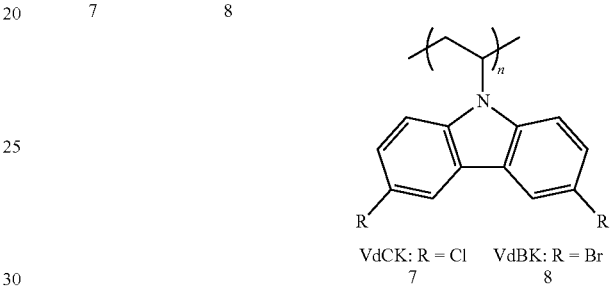

0.2 g (0.76 mol) of the compound 7 and 0.5 mg of AIBN were mixed in 1 mL of a toluene solvent and stirred at about 70° C. for about 20 hours to obtain compound 9. Alternatively, 0.286 g (0.082 mol) of the compound 8 and 5.5 g of AIBN were mixed in 1 mL of a toluene solvent and stirred at about 70° C. for about 20 hours to obtain compound 10.

TABLE 3

| Compound | 1H-NMR(δ:ppm) | 13C-NMR (δ:ppm) | FAB-MS (m/z) |
|---|---|---|---|
| 7 | 7.98(d, 2H, J = 2.3 Hz, Ph), 7.56(d, 2H, J = 8.5 Hz, Ph), 7.44(dd, 2H, J = 9.1, 2.3 Hz, Ph), 7.20(dd, 1H, J = 15.9, 9.1 Hz, NCH=CH$_2$), 5.53 (dd, 1H, J = 15.9, 1.1 Hz, trans-CH=CH), 5.25(dd, 1H, J = 9.1, 1.1 Hz, cis-CH=CH) | 138.0, 129.1, 126.9, 126.5, 124.3, 120.2, 111.6, 104.1 | 260.9 (found) 261.0 (calcd) |
| 8 | 8.13(d, 2H, J = 1.7 Hz, Ph), 7.58(dd, 2H, J = 8.8, 2.0 Hz Ph), 7.44(d, 2H, J = 9.1 Hz, Ph), 7.20(dd, 1H, J = 15.9, 9.1 Hz, NCH = CH$_2$), 5.54 (dd, 1H, J = 15.9, 1.1 Hz, trans-CH=CH), 5.26(dd, 1H, J = 9.1, 1.1 Hz, cis-CH=CH) | 138.1, 129.7, 128.9, 124.2, 122.9, 113.4, 112.0, 104.1 | 350.8 (found) 351.0 (calcd) |

Example 1

Manufacture of Electrode

The PTmVK polymer, a vapor grown carbon fiber (VGCF) as a conducting agent, and PVdF as a binder were mixed in a weight ratio of about 1:8:1 to prepare a slurry. The slurry was coated on a metal current collector, dried, and then roll-pressed to manufacture an electrode including the PTmVK polymer.

Manufacture of Half Cell

The manufactured electrode was used as a working electrode, and a lithium foil was used as a counter electrode. A half cell was manufactured according to a known process by interposing a separator (Celgard 2400) between the working electrode and the counter electrode and using a solution of 1M $LiPF_6$ in a mixture of ethylene carbonate and diethyl carbonate (3:7 (v/v)) as a liquid electrolyte.

Example 2

A half cell was manufactured in the same manner as in Example 1, except that the PTdVK polymer was used, instead of the PTmVK polymer.

Examples 3 and 4

Half cells were manufactured in the same manner as in Example 1, except that the PdCVK polymer and the PdBVK polymer were used, respectively, instead of the PTmVK polymer.

Evaluation Example 1

Electrochemical Evaluation (1)

Figure 2A:
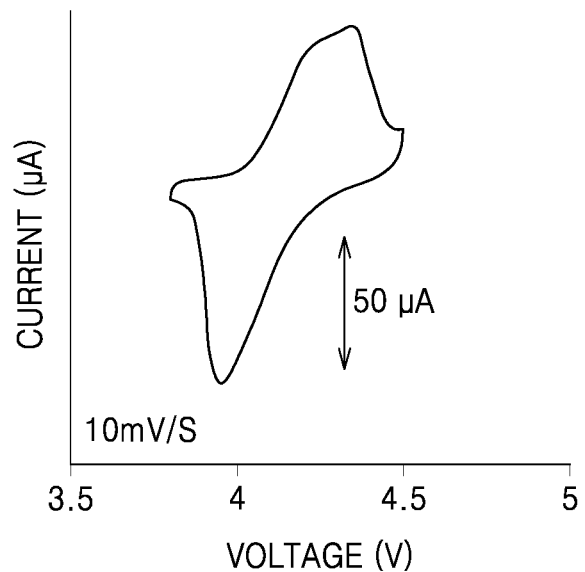
FIG. 2A is a graph of current (microamperes, μA) versus voltage (volts (V) versus Li/Li$^+$) showing the results of cyclic voltammetry analysis of a half cell manufactured according to Example 1.
Figure 2B:
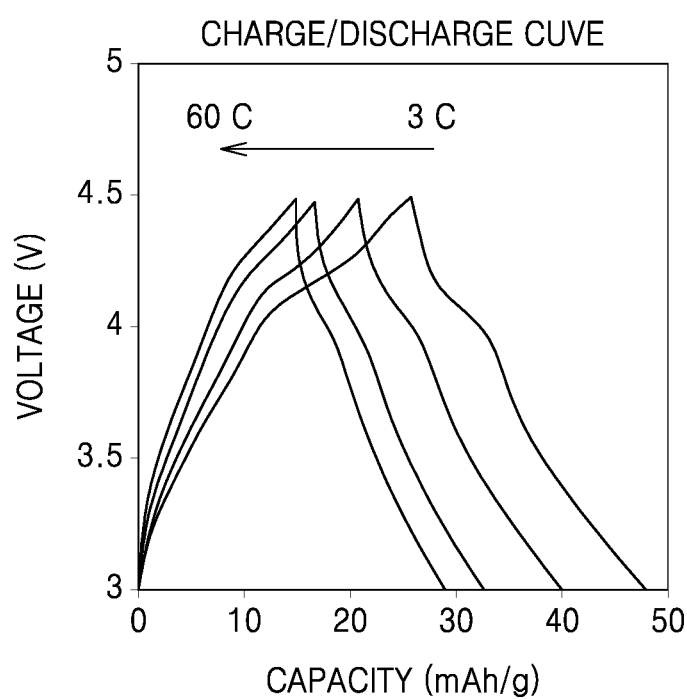
FIG. 2B is a graph of voltage (volts) versus capacity (milliampere-hours per gram) showing the results of electrochemical evaluation of a half cell manufactured according to Example 1.

The half-cell manufactured in Example 1 was analyzed by cyclic voltammetry for one cycle at a sweep rate of 10 millivolts per second (mV/S) between 3.7 V and 4.5 V, versus $Li/Li^+$. The results are shown in FIG. 2A. The half cell manufactured in Example 1 was then charged at a 3C rate, a 10C rate, a 40C rate, or a 60C rate, and discharged until a voltage of 3 V was reached. Changes in capacity and voltage at the different charge rates are represented in FIG. 2B.

Figure 3A:
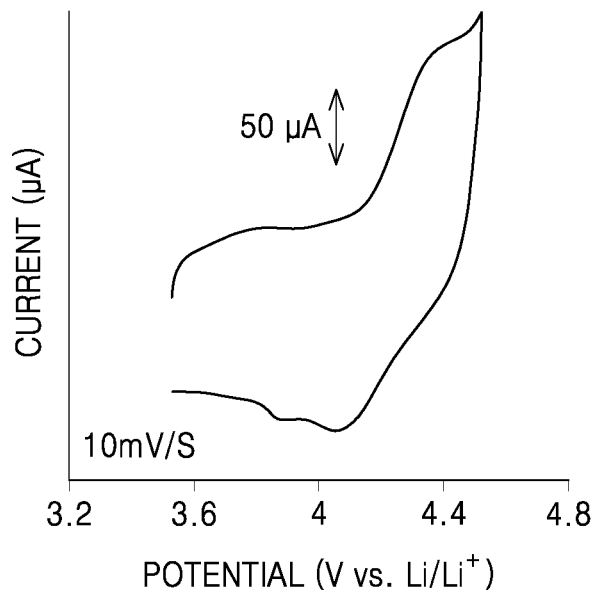
FIGS. 3A is a graph of current (microamperes, μA) versus voltage (volts (V) versus Li/Li$^+$) showing the results of cyclic voltammetry analysis of a half cell manufactured according to Example 2.
Figure 3B:
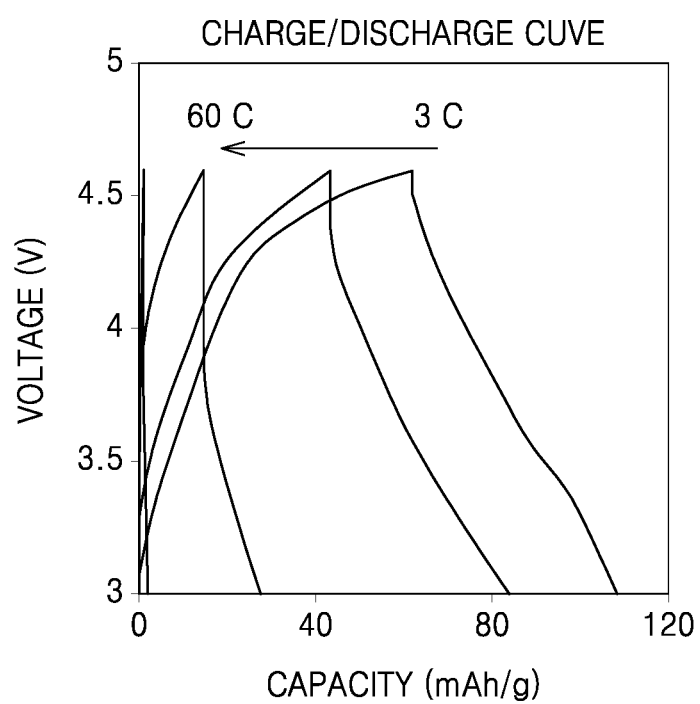
FIG. 3B is a graph of voltage (volts) versus capacity (milliampere-hours per gram) showing the results of electrochemical evaluation of a half cell manufactured according to Example 2.
Figure 3C:
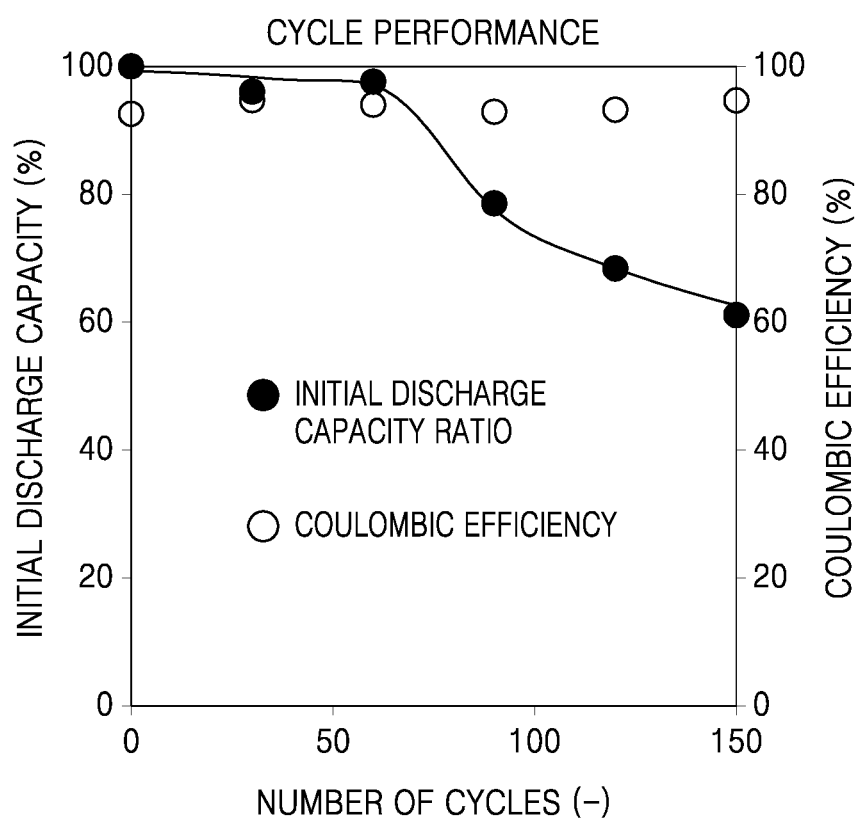
FIG. 3C is a graph of initial discharge capacity (percent (%)) and coulombic efficiency (%) versus number of cycles showing the results of electrochemical evaluation of a half cell manufactured according to Example 2.

The cyclic voltammetry analysis between 3.6V and 4.5V versus $Li/Li^+$, using a sweep rate of 10 mV/S, and a charge-discharge experiment was also performed on the half cell manufactured in Example 2, to obtain the results shown in FIGS. 3A and 3B, respectively. The half-cell manufactured in Example 2 was charged at about 25° C. at a charge rate of 5C until a voltage of 4.5 V was reached and then discharged at a constant current of 5C rate until a voltage of 3 V was reached. This charge and discharge cycle was continuously repeated 150 times, and then an initial discharge capacity ratio and Coulombic efficiencies according to the progress of the cycles were calculated. The results are shown in FIG. 3C.

The initial discharge capacity ratio was calculated using Equation 1.

Initial discharge efficiency [%]=[Discharge capacity at $1^{st}$ cycle/Charge capacity at $1^{st}$ cycle]×100%    Equation 1

Referring to FIGS. 2A, 2B, and 3A to 3C, the half cell of Example 1 was found to have a voltage of about 4.15 V versus $Li/Li^+$, and the half cell of Example 2 was found to have a voltage of about 4.29 V versus $Li/Li^+$.

Evaluation Example 2

Electrochemical Evaluation (2)

Figure 4A:
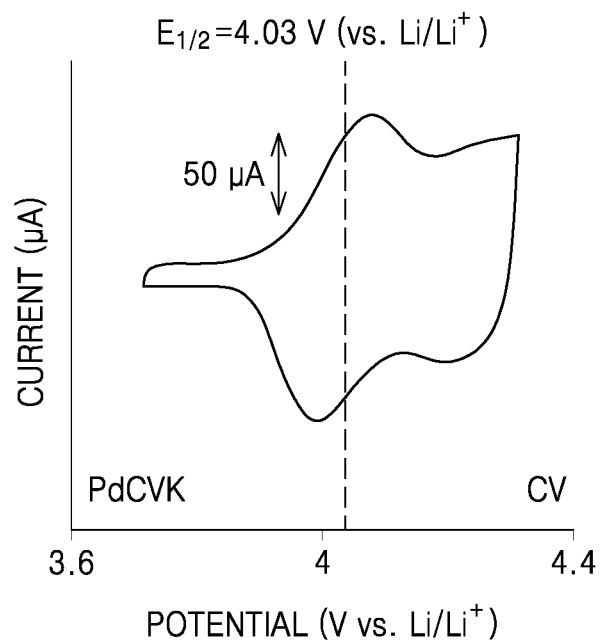
FIG. 4A is a graph of current (microamperes, μA) versus potential (volts (V) versus Li/Li$^+$) showing the results of cyclic voltammetry analysis of a half cell manufactured according to Example 3.
Figure 4B:
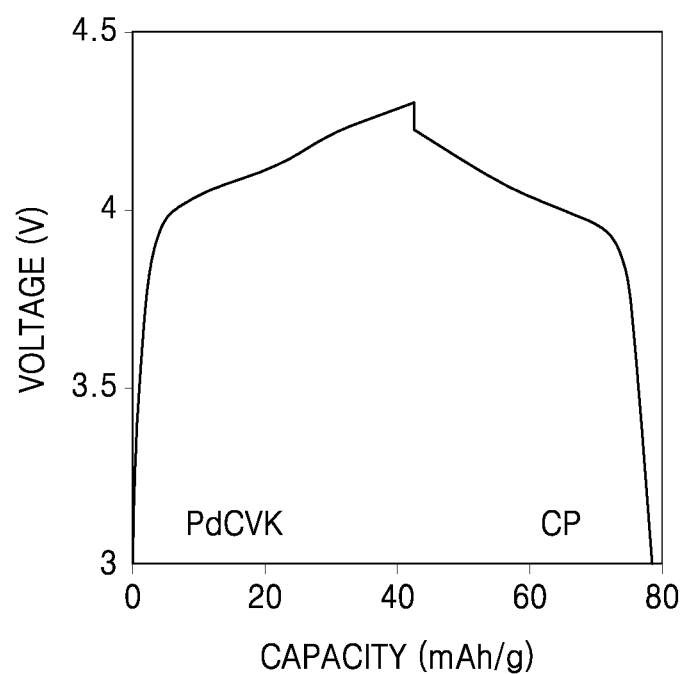
FIG. 4B is a graph of voltage (volts) versus capacity (milliampere-hours per gram) showing the results of electrochemical evaluation of a half cell manufactured according to Example 3.
Figure 4C:
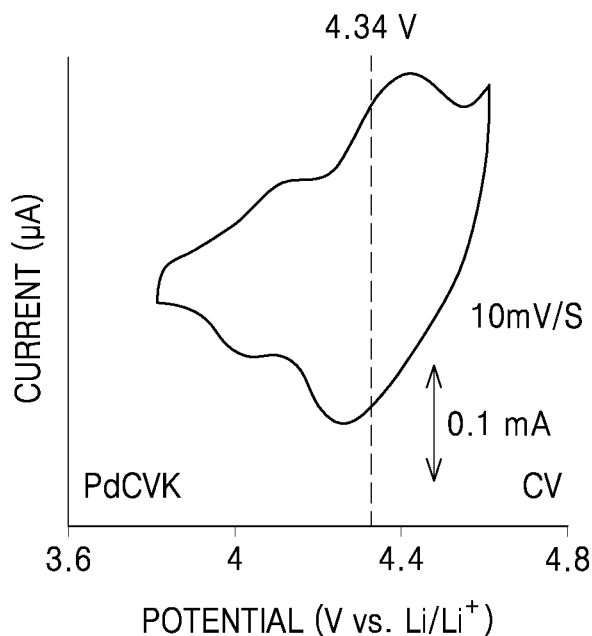
FIG. 4C is a graph of current (microamperes, μA) versus potential (volts (V) versus Li/Li$^+$) showing the results of cyclic voltammetry analysis of a half cell manufactured according to Example 4.

Results of cyclic voltammetry analysis of the half cell manufactured in Example 3 are shown in FIG. 4A. Also, the cell was charged once at a 0.1C rate to a voltage of 4.3 V, and then discharged at a discharge rate of 0.1C until a voltage of 3.6 V, each versus $Li/Li^+$. Changes in voltage during the charging and discharging are represented in FIG. 4B The results of cyclic voltammetry analysis between 3.7V and 4.5V versus $Li/Li^+$, using a scan rate of 10 mV/s, for the half-cell manufactured in Example 4, are shown in FIG. 4C.

Example 5

Manufacture of Electrode

The PTmVK polymer, $LiCoO_2$ as a metal oxide, a vapor grown carbon fiber (VGCF) as a conducting agent, and PVdF as a binder were mixed together in a weight ratio of about 1:6:2:1 to prepare a slurry. The slurry was coated on a metal current collector, dried, and then roll-pressed to manufacture an electrode.

Manufacture of Half-Cell

The manufactured electrode was used as a working electrode, and a lithium foil was used as a counter electrode. A half cell was manufactured according to processes known to person of skill in battery manufacturing by interposing a separator (Celgard 2400) between the working electrode and the counter electrode and using a solution of 1M $LiPF_6$ dissolved in a mixture of ethylene carbonate and diethyl carbonate (3:7 by volume) as a liquid electrolyte.

Comparative Example 1

A half cell was manufactured in the same manner as in Example 5, with the exception that the PTmVK polymer was not included in the making of the electrode.

Evaluation Example 3

Electrochemical Evaluation (3)

Figure 5:
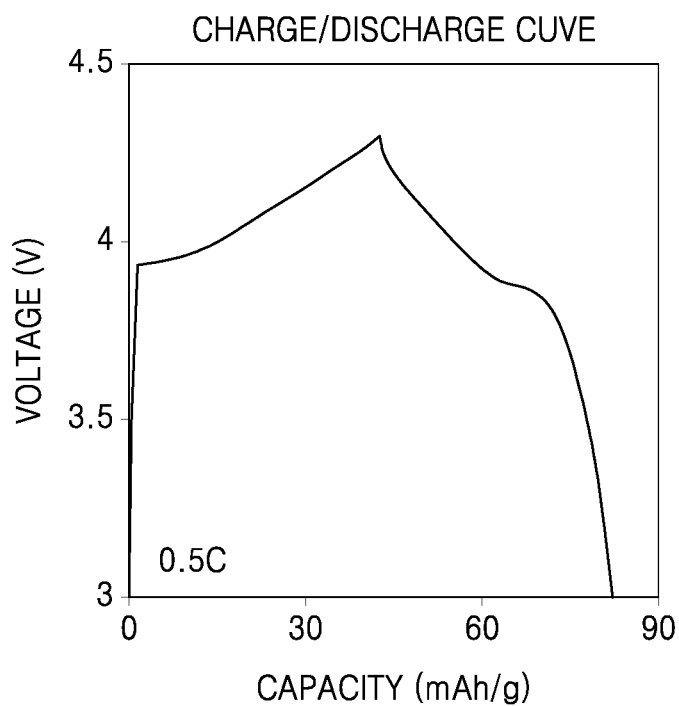
FIG. 5 is a is a graph of voltage (volts) versus capacity (milliampere-hours per gram) showing the results of charge/discharge analysis of a half cell of Example 5 at a rate of 0.5 C.

The half cell manufactured in Example 5 was charged once at a 0.1C rate at a constant voltage (CV) and then discharged at a discharge rate of 0.1C until a voltage of 3.6 V was reached. Changes in voltage during the charging and discharging are represented in FIG. 5.

Figure 6:
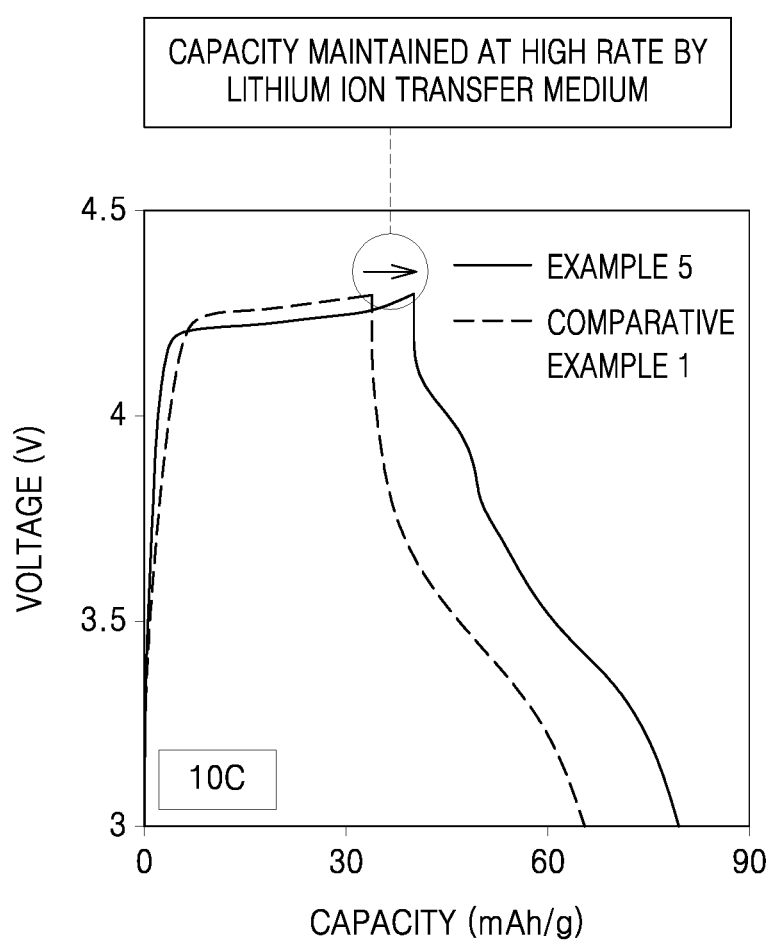
FIG. 6 is a graph of voltage (volts) versus capacity (milliampere-hours per gram) showing the results of electrochemical evaluation of the half cell of Example 5 and a half cell of Comparative Example 1 at a rate of 10 C.

The half cells manufactured in Example 5 and Comparative Example 1 were charged at about 25° C. at a 0.1C rate until a voltage of 4.3 V was reached and then discharged at a discharge rate of 10 C until a voltage of 3.0 V was reached. Charge and discharge plots of the half cells of Example 5 and Comparative Example 1 are shown in FIG. 6. As shown in FIG. 6, the half cell of Example 5 exhibits significantly greater capacity at the same voltage by about 5 milliAmpere-hours per gram (mAh/g), as compared with the half cell of Comparative Example 1 not containing the PTmVK polymer.

Examples 6 to 9 and Comparative Examples 2 to 10

Manufacture of Electrode

Polymers, metal oxides, and conducting agents were mixed in a weight ratio as represented in Table 4 to prepare slurries. The slurries were coated on metal current collectors, dried, and then roll-pressed to thereby manufacture the respective electrodes.

Manufacture of Half Cell

Each of the manufactured electrodes was used as a working electrode, and a lithium foil was used as a counter electrode. Half cells were manufactured according to processes known to person of skill in battery manufacturing by interposing a separator (Celgard 2400) between each of the working electrodes and the counter electrode and using a solution of 1M $LiPF_6$ dissolved in a mixture of ethylene carbonate and diethyl carbonate (3:7 by volume) as a liquid electrolyte.

Evaluation Example 4

Electrochemical Evaluation 4

The half cells manufactured in Examples 6 to 9 and Comparative Examples 2 to 10 were charged at about 25° C. at a charge rate of 5 C or 10 C until a voltage of 4.3 V was reached, and then discharged at a constant discharge rate of 5 C or 10 C until a voltage of 3 V was reached. Capacities of the half cells are represented in Table 4.

TABLE 4

| Example | Ratio of metal oxide/ polymer | Metal oxide | Potential | % | Polymer | Potential | % | Carbon (Conducting agent) Carbonaceous material | % | Rapid charge capacity (5 C) | Rapid charge capacity (10 C) |
|---|---|---|---|---|---|---|---|---|---|---|---|
| Example 6 | 6:1 | LCO | 3.92 V | 60% | CL-PTmVK | 4.15 V | 10% | SWNT | 20% | 69 | — |
| Example 7 | 9:1 | LCO | 3.92 V | 45% | PTmVK | 4.15 V | 5% | AB | 40% | 73 | — |
| Example 8 | 6:1 | LCO | 3.92 V | 60% | PdCVK | 4.03 V | 10% | SWNT | 20% | 87 | — |
| Example 9 | 6:1 | LCO | 3.92 V | 60% | PdCVK | 4.03 V | 10% | SWNT | 20% | — | 52 |
| Comp. Ex. 2 | 1:0 | LCO | 3.92 V | 70% | — | — | — | SWNT | 20% | 64 | — |
| Comp. Ex. 3 | 0:1 | — | — | — | PTmVK | 4.15 V | 70% | SWNT | 20% | 50 | — |
| Comp. Ex. 4 | 1:6 | LCO | 3.92 V | 10% | PTmVK | 4.15 V | 60% | SWNT | 20% | 0 | — |
| Comp. Ex. 5 | 0:1 | — | — | — | PdCVK | 4.03 V | 70% | SWNT | 20% | 45 | — |
| Comp. Ex. 6 | 1:1 | LCO | 3.92 V | 10% | PdCVK | 4.03 V | 10% | AB | 20% | 35 | — |
| Comp. Ex. 7 | 1:0 | LCO | 3.92 V | 70% | — | — | — | SWNT | 20% | — | 34 |
| Comp. Ex. 8 | 6:1 | LCO | 3.92 V | 60% | Compound A | 3.9 V | 10% | SWNT |  | 50 | — |
| Comp. Ex. 9 | 6:1 | LCO | 3.92 V | 60% | Compound B | 3.7 V | 10% | SWNT | 20% | 46 | — |
| Comp. Ex 10 | 6:1 | LCO | 3.92 V | 60% | Compound C | 3.8 V | 10% | SWNT | 20% | 55 | — |

Compound A

Compound B

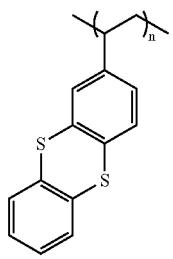

Compound C

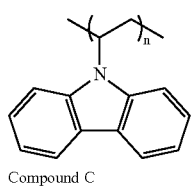

TABLE 4-continued

| | Ratio of metal oxide/ polymer | Metal oxide Metal | Potential | % | Polymer Polymer | Potential | % | Carbon (Conducting agent) Carbonaceous material | % | Rapid charge capacity (5 C) | Rapid charge capacity (10 C) |
|---|---|---|---|---|---|---|---|---|---|---|---|
| Example | | | | | | | | | | | |

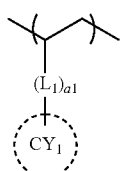

Referring to Table 4, the half cells of Examples 6 to 9 using the mixtures of polymers and a metal oxide were found to have greater rapid charge capacities as compared with the half cells of Comparative Examples 2 to 10. The greater charge capacities exhibited in the batteries of Examples 6 to 9 are likely indicative that the added polymers do not decompose during the charging and discharge because of the relatively high oxidation-reduction potentials of the polymers. Moreover, the polymers can provide a transfer path of lithium ions proximate to the electrode.

As described and demonstrated above, according to the disclosed embodiment, a lithium secondary battery using an electrode which contains a polymer that includes a repeating unit represented by at least one of Formula 1a or 1b may have a high capacity. The polymer according to any of the embodiments may stay inactive at a charging voltage of a metal oxide having a high potential and serve as a transfer path of lithium ions. Accordingly, the electrodes with the metal oxide possess a relatively high potential and may be charged at a high rate (rapid charging).

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A polymer comprising: a repeating unit represented by at least one of Formula 1a or Formula 1b

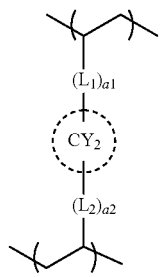

Formula 1a

Formula 1b wherein, in Formulae 1a and 1b,
$CY_1$ is a group represented by at least one of Formula 1-2 or Formula 1-4,
$CY_2$ is a group represented by Formula 1-3,

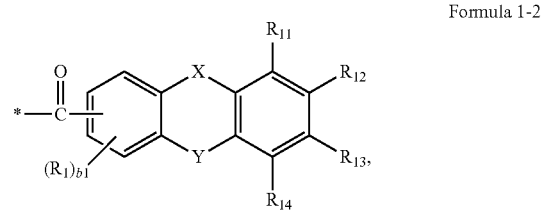

Formula 1-2

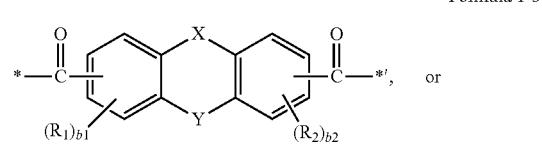

Formula 1-3

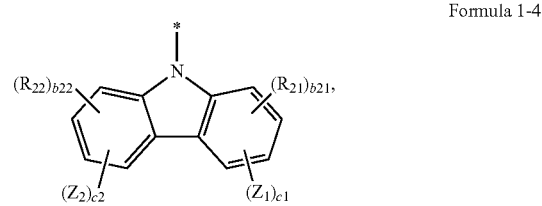

Formula 1-4

$L_1$ and $L_2$ are each independently a single bond, a substituted or unsubstituted $C_1$-$C_{20}$ alkylene group, a substituted or unsubstituted $C_2$-$C_{20}$ alkenylene group, or a substituted or unsubstituted $C_2$-$C_{20}$ alkynylene group, and a1 and a2 are each independently an integer from 1 to 5, and two or more $L_1$ are the same or different from one another when a1 is 2 or greater, and two or more $L_2$ are the same or different from each other when a2 is 2 or greater, wherein, in Formulae 1-2 and 1-3, X and Y are each independently O or S, $R_1$, $R_2$, and $R_{11}$ to $R_{14}$ are each independently hydrogen, deuterium, —F, —Cl, —Br, —I, a hydroxyl group, a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group, b1 and b2 are each independently an integer from 1 to 3, and two or more $R_1$ are the same or different from one another when b1 is 2 or greater, and two or more $R_2$ are the same or different from one another when b2 is 2 or greater, and in Formula 1-4, $R_{21}$ and $R_{22}$ are each independently hydrogen, deuterium, —F, —Cl, —Br, —I, a hydroxyl group, a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, or a substituted or unsubstituted monovalent non-aromatic condensed heteropolycyclic group, b21 and b22 are each independently an integer from 0 to 3, and two or more $R_{21}$ are the same or different from one another when b21 is 2 or greater, and two or more $R_{22}$ are the same or different from one another when b22 is 2 or greater, $Z_1$ and $Z_2$ are each independently an electron withdrawing group, C1 and c2 are each independently an integer of 1 to 4, the sum of b21 and c1 is 4, the sum of b22 and c2 is 4, is a binding site to $L_1$ in Formulae 1a and 1b, and is a binding site to $L_2$ in Formula 1b.

2. The polymer of claim 1, wherein, in Formula 1a, $L_1$ is a single bond, a methylene group, an ethylene group, a propylene group, a butylene group, or a pentylene group; or a methylene group, an ethylene group, a propylene group, a butylene group, and a pentylene group, each of which is substituted with at least one of deuterium, a halogen, or a $C_1$-$C_5$ alkyl group.

3. The polymer of claim 1, wherein, in Formulae 1-2 and 1-3, X and Y are the same.

4. The polymer of claim 1, wherein, in Formulae 1-2 and 1-3, $R_1$ and $R_2$ are each independently hydrogen, deuterium, —F, —Cl, —Br, —I, a cyano group, a nitro group, a carboxylic acid group or a salt thereof, a sulfonic acid group or a salt thereof, a phosphoric acid group or a salt thereof, a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group; or a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, and a sec-isopentyl group, each of which is substituted with at least one of deuterium, —F, —Cl, —Br, —I, a cyano group, a nitro group, a carboxylic acid group or a salt thereof, a sulfonic acid group or a salt thereof, or a phosphoric acid group or a salt thereof.

5. The polymer of claim 1, wherein the group represented by Formula 1-2 is represented by at least one of Formula 1-2-1, Formula 1-2-2, Formula 1-2-3, or Formula 1-2-4

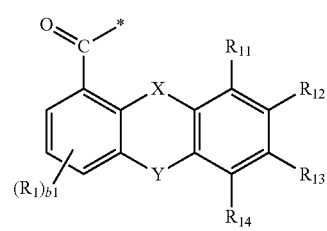

1-2-1

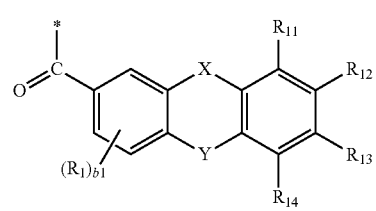

1-2-2

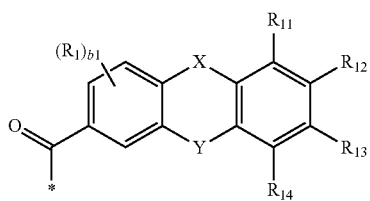

1-2-3

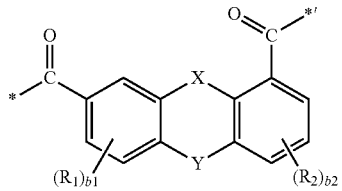

1-3-5

1-2-4

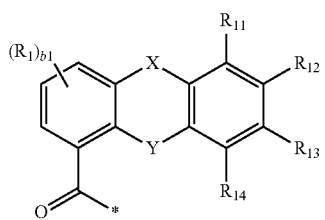

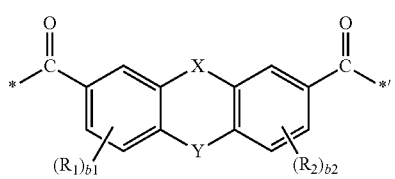

1-3-6

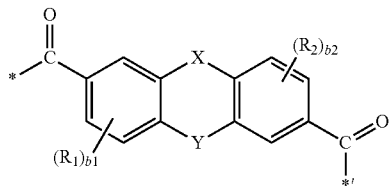

1-3-7 wherein, in Formula 1-2-1 to Formula 1-2-4, $R_1$, $b_1$, and $R_{11}$ to $R_{14}$ are defined the same as those of claim 1.

6. The polymer of claim 1, wherein the group represented by Formula 1-3 is represented by at least one of Formula 1-3-1, Formula 1-3-2, Formula 1-3-3, Formula 1-3-4, Formula 1-3-5, Formula 1-3-6, Formula 1-3-7, or Formula 1-3-8

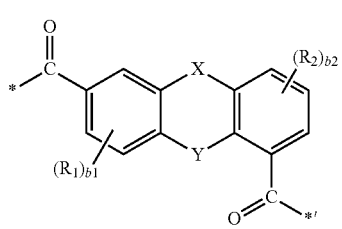

1-3-8

1-3-1

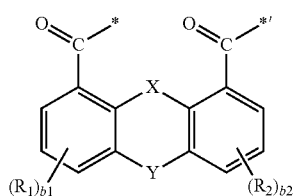

wherein, in Formula 1-3-1 to Formula 1-3-8, $R_1$, $R_2$, b1, and b2 are defined the same as those of claim 1.

7. The polymer of claim 1, wherein, in Formula 1-4, $R_{21}$ and $R_{22}$ are each independently 1-3-2

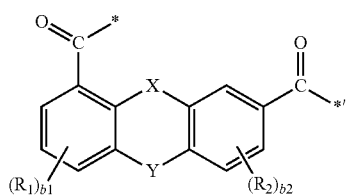

hydrogen, deuterium, —F, —Cl, —Br, —I, a cyano group, a nitro group, a carboxylic acid group or a salt thereof, a sulfonic acid group or a salt thereof, a phosphoric acid group or a salt thereof, a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, or a sec-isopentyl group; or 1-3-3

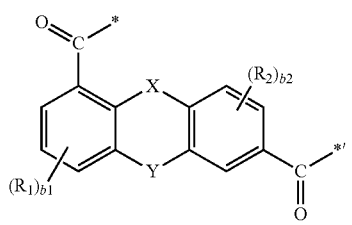

a methyl group, an ethyl group, an n-propyl group, an iso-propyl group, an n-butyl group, an isobutyl group, a sec-butyl group, a tert-butyl group, an n-pentyl group, an isopentyl group, a neopentyl group, a sec-pentyl group, 3-pentyl group, and a sec-isopentyl group, each of which is substituted with at least one of deuterium, —F, —Cl, —Br, —I, a cyano group, a nitro group, a carboxylic acid group or a salt thereof, a sulfonic acid group or a salt thereof, or a phosphoric acid group or a salt thereof.

1-3-4

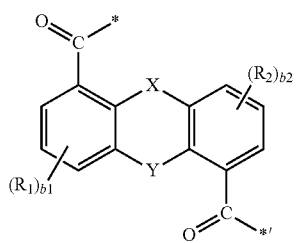

8. The polymer of claim 1, wherein the group represented by Formula 1-4 is at least one of Formula 1-4-1, Formula 1-4-2, Formula 1-4-3, Formula 1-4-4, Formula 1-4-5, Formula 1-4-6, Formula 1-4-7, Formula 1-4-8, Formula 1-4-9, Formula 1-4-10, Formula 1-4-11, Formula 1-4-12, Formula 1-4-13, Formula 1-4-14, Formula 1-4-15, or Formula 1-4-16

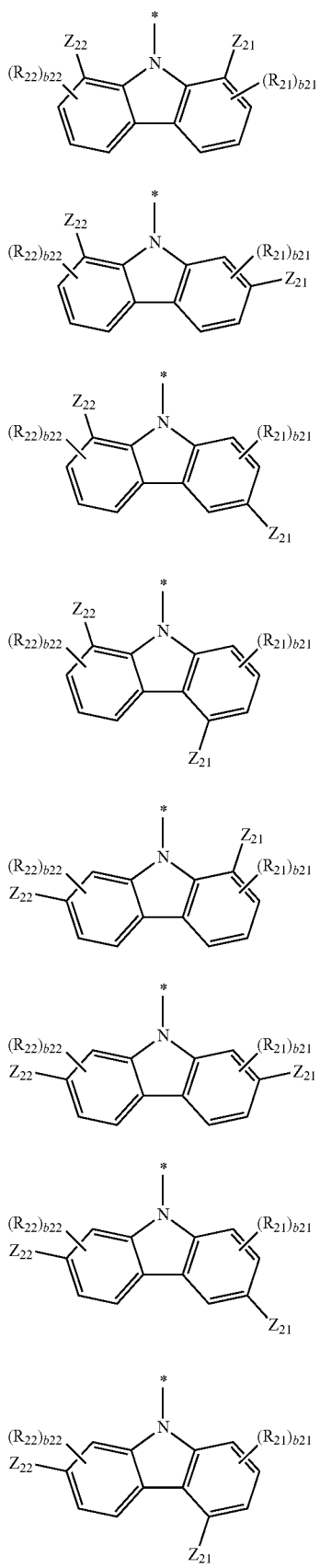
1-4-1
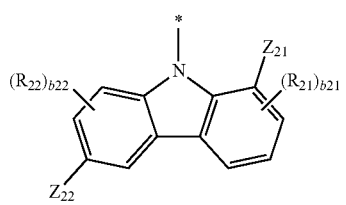
1-4-2
1-4-3
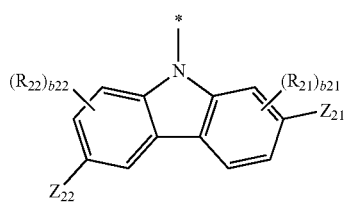
1-4-4
1-4-5
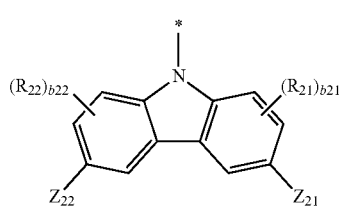
1-4-6
1-4-7
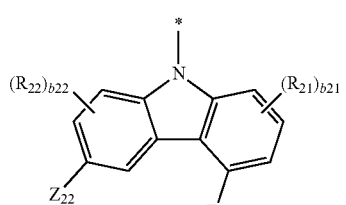
1-4-8
1-4-9
1-4-10
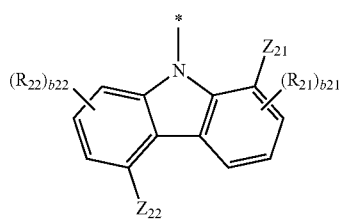
1-4-11
1-4-12
1-4-13
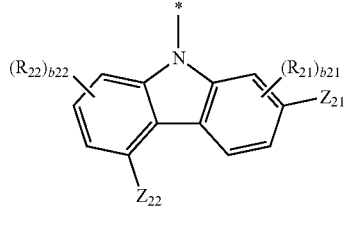
1-4-14
1-4-15
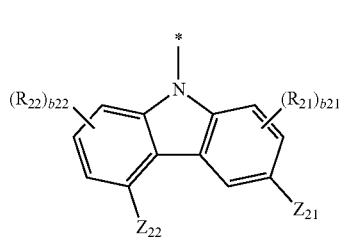

-continued 1-4-16

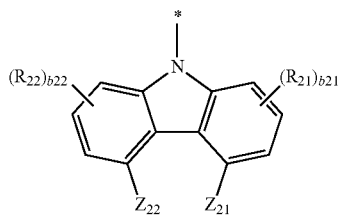

wherein, in Formula 1-4-1 to Formula 1-4-16, $R_{21}$, $R_{22}$, b21, and b22 are defined the same as those of claim 1, and $Z_{21}$ and $Z_{22}$ are defined the same as $Z_1$ and $Z_2$, respectively, of claim 1.

9. The polymer of claim 1, wherein, in Formula 1-4, $Z_1$ and $Z_2$ are each independently —F, —Cl, —Br, or —I.

10. The polymer of claim 1, wherein the polymer comprises a repeating unit represented by at least one of Formula 1a-1, Formula 1a-2, Formula 1a-3, or Formula 1b-1

1a-1

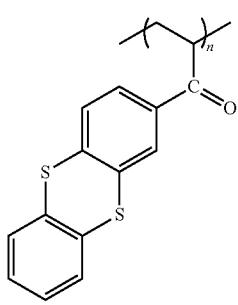

1a-2

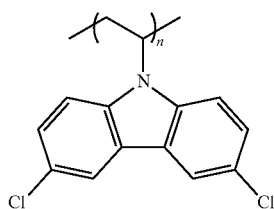

1a-3

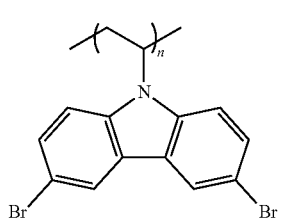

-continued 1b-1

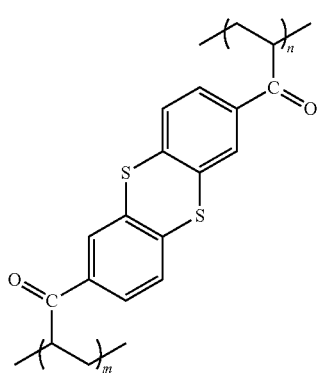

wherein, in Formula 1a-1, Formula 1a-2, Formula 1a-3, or Formula 1b-1, m and n are each independently an integer from 2 to 10,000.

11. A composite positive active material comprising:
a metal oxide; and
the polymer of claim 1.

12. The composite positive active material of claim 11, wherein the metal oxide has an oxidation-reduction potential of about 3.7 volts to about 5 volts, versus Li/Li$^+$.

13. The composite positive active material of claim 12, wherein the metal oxide is represented by Formula 2

$$Li_aA_bO_c \qquad \text{Formula 2}$$

wherein, in Formula 2, $0.9 \leq a \leq 1.1$, $0.98 \leq b \leq 1.00$, and $1.9 \leq c \leq 2.1$, and A is at least one of nickel, cobalt, manganese, vanadium, magnesium, gallium, silicon, tungsten, molybdenum, iron, chromium, copper, zinc, titanium, aluminum, or boron.

14. The composite positive active material of claim 11, wherein at least part of a surface of the metal oxide is covered with the polymer.

15. The composite positive active material of claim 11, wherein the polymer has an oxidation-reduction potential greater than an oxidation-reduction potential of the metal oxide.

16. The composite positive active material of claim 11, wherein the polymer is not oxidized or reduced when in contact with lithium.

17. The composite positive active material of claim 11, wherein an amount of the polymer is about 40 weight percent to about 1 weight percent, based on a total weight of the composite positive active material.

18. The composite positive active material of claim 11, wherein a weight ratio of the metal oxide to the polymer is about 6:1 to about 9:1.

19. A lithium secondary battery comprising:
a positive electrode comprising the composite positive active material of claim 11;
a negative electrode; and
an electrolyte between the positive electrode and the negative electrode.

20. The lithium secondary battery of claim 19, wherein the battery has a specific capacity after charging at a charge rate of 5 C of about 65 milliampere-hours per gram to about 200 milliampere-hours per gram.

* * * * *